(12) United States Patent
Dong et al.

(10) Patent No.: US 11,893,421 B2
(45) Date of Patent: Feb. 6, 2024

(54) DATA MOVEMENT BETWEEN STORAGE TIERS OF A CLUSTERED STORAGE SYSTEM BASED ON INPUT/OUTPUT PATTERNS OF STORAGE OBJECTS

(71) Applicant: Dell Products L.P., Round Rock, TX (US)

(72) Inventors: Hailan Dong, Chengdu (CN); Chi Chen, Chengdu (CN); Huijuan Fan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 17/697,224

(22) Filed: Mar. 17, 2022

(65) Prior Publication Data

US 2023/0281049 A1    Sep. 7, 2023

(30) Foreign Application Priority Data

Mar. 4, 2022  (CN) .......................... 202210213889.6

(51) Int. Cl.
    *G06F 9/50* (2006.01)
    *G06F 11/34* (2006.01)

(52) U.S. Cl.
    CPC ........ *G06F 9/5033* (2013.01); *G06F 11/3495* (2013.01)

(58) Field of Classification Search
    CPC .. G06F 9/5033; G06F 11/3495; G06F 3/0604; G06F 3/0659; G06F 3/0683; G06F 9/45558; G06F 2009/45579
    See application file for complete search history.

(56) References Cited

U.S. PATENT DOCUMENTS 8,239,584 B1 * 8/2012 Rabe .................... G06F 3/0605
                                                        711/170
8,478,731 B1 * 7/2013 Throop ............... G06F 16/1744
                                                        707/693

(Continued)

OTHER PUBLICATIONS

NVM Express, "NVM Express, Revision 1.3," NVM Express, May 1, 2017, 282 pages.

(Continued)

*Primary Examiner* — Jorge A Chu Joy-Davila
(74) *Attorney, Agent, or Firm* — Ryan, Mason & Lewis, LLP

(57) ABSTRACT

An apparatus comprises a processing device configured to classify an input/output pattern of a given storage object that is stored utilizing a first type of storage resources associated with a first storage tier in the clustered storage system, and to identify, for the classified input/output pattern, a performance difference between utilizing first and second types of storage resources associated with first and second storage tiers in the clustered storage system. The processing device is further configured to determine, based at least in part on the identified performance difference, whether to move the given storage object from the first type of storage resources associated with the first storage tier to the second type of storage resources associated with the second storage tier in the clustered storage system and to move, responsive to the determination, the given storage object to the second type of storage resources associated with the second storage tier.

20 Claims, 26 Drawing Sheets

(56) References Cited

U.S. PATENT DOCUMENTS

| | | | | |
|---|---|---|---|---|
| 8,566,483 B1* | 10/2013 | Chen | G06F 3/0689 |
| | | | 710/18 |
| 8,838,887 B1* | 9/2014 | Burke | G06F 3/0689 |
| | | | 711/112 |
| 9,052,830 B1* | 6/2015 | Marshak | G06F 3/0611 |
| 9,256,381 B1* | 2/2016 | Fultz | G06F 16/185 |
| 9,323,655 B1* | 4/2016 | Sahin | G06F 3/0685 |
| 9,965,381 B1* | 5/2018 | Sahin | G06F 3/0685 |
| 10,042,578 B2* | 8/2018 | Karve | G06F 3/061 |
| 10,353,616 B1* | 7/2019 | Tao | G06F 3/061 |
| 10,353,634 B1* | 7/2019 | Greenwood | G06F 3/0665 |
| 10,678,431 B1* | 6/2020 | Smaldone | G06F 3/0604 |
| 2012/0102350 A1* | 4/2012 | Belluomini | G06F 1/3221 |
| | | | 711/E12.001 |
| 2020/0218464 A1* | 7/2020 | Patil | G06F 3/0605 |
| 2021/0405908 A1* | 12/2021 | Bassett | G06F 3/0635 |

OTHER PUBLICATIONS

Dell EMC, "Dell EMC VMAX3 Family," Data Sheet, Nov. 2016, 8 pages.
Dell Technologies, "Dell EMC VMAX all Flash: Family Overview," Technical White Paper, Sep. 2020, 40 pages.
Dell Technologies, "Dell EMC Unity: Unisphere Overview," Technical White Paper, Feb. 2020, 41 pages.
EMC2, "FAST.X with EMC CloudArray," White Paper, Sep. 2015, 11 pages.
Dell EMC "Dell EMC VMAX all Flash and VMAX3: Reliability, Availability, and Serviceability," Technical White Paper, Dec. 2020, 57 pages.

* cited by examiner

200 — CLASSIFY, BASED AT LEAST IN PART ON MONITORING INPUT/OUTPUT OPERATIONS FOR A GIVEN STORAGE OBJECT FOR A DESIGNATED PERIOD OF TIME, AN INPUT/OUTPUT PATTERN ASSOCIATED WITH THE GIVEN STORAGE OBJECT, THE GIVEN STORAGE OBJECT BEING STORED UTILIZING A FIRST TYPE OF STORAGE RESOURCES IN A GIVEN ONE OF TWO OR MORE STORAGE SYSTEMS IN A CLUSTERED STORAGE SYSTEM, THE FIRST TYPE OF STORAGE RESOURCES BEING ASSOCIATED WITH A FIRST ONE OF TWO OR MORE STORAGE TIERS IN THE CLUSTERED STORAGE SYSTEM

202 — IDENTIFY, FOR THE CLASSIFIED INPUT/OUTPUT PATTERN, A PERFORMANCE DIFFERENCE BETWEEN (I) UTILIZING THE FIRST TYPE OF STORAGE RESOURCES ASSOCIATED WITH THE FIRST ONE OF THE TWO OR MORE STORAGE TIERS IN THE CLUSTERED STORAGE SYSTEM AND (II) UTILIZING AT LEAST A SECOND TYPE OF STORAGE RESOURCES ASSOCIATED WITH AT LEAST A SECOND ONE OF THE TWO OR MORE STORAGE TIERS IN THE CLUSTERED STORAGE SYSTEM

204 — DETERMINE, BASED AT LEAST IN PART ON THE IDENTIFIED PERFORMANCE DIFFERENCE, WHETHER TO MOVE THE GIVEN STORAGE OBJECT FROM BEING STORED UTILIZING THE FIRST TYPE OF STORAGE RESOURCES ASSOCIATED WITH THE FIRST ONE OF THE TWO OR MORE STORAGE TIERS IN THE CLUSTERED STORAGE SYSTEM TO THE SECOND TYPE OF STORAGE RESOURCES ASSOCIATED WITH THE SECOND ONE OF THE TWO OR MORE STORAGE TIERS IN THE CLUSTERED STORAGE SYSTEM

206 — MOVE, RESPONSIVE TO THE DETERMINATION, THE GIVEN STORAGE OBJECT TO THE SECOND TYPE OF STORAGE RESOURCES ASSOCIATED WITH THE SECOND ONE OF THE TWO OR MORE STORAGE TIERS IN THE CLUSTERED STORAGE SYSTEM

FIG. 2

| APPLICATION | IO SIZE | READ/WRITE RATIO | RANDOM/SEQUENTIAL RATIO |
|---|---|---|---|
| WEB FILE SERVER | 4KB/8KB/64KB | 95%R/5%W | 75%R/25%S |
| WEB SERVER LOG | 8KB | 100%W | 100%R |
| OS PAGING | 64KB | 90%R/10%W | 100%S |
| EXCHANGE SERVER | 4KB | 67%R/33%W | 100%R |
| WORKSTATION | 8KB | 80%R/20%W | 80%R/20%S |
| MEDIA STREAMING | 64KB | 98%R/2%W | 100%S |
| OLTP - DATA | 8KB | 70%R/30%W | 100%R |
| OLTP - LOG | 512B - 64KB | 100%W | 100%R |

FIG. 3

| OBJECT | IO PATTERN | CURRENT STORAGE TIER | SSD PERF: $G_{j,1}$ | SAS PERF: $G_{j,2}$ | NL-SAS PERF: $G_{j,3}$ |
|---|---|---|---|---|---|
| $o_{11}$ | P1 (4K_70R_0S) | SAS | 2.085 | 0.624 | 0.29 |
| $o_{12}$ | P2 (8K_0R_100S) | SAS | 1.01 | 0.99 | 0.99 |
| $o_{13}$ | P3 (8K_90R_100S) | NL-SAS | 1.35 | 0.85 | 0.78 |
| $o_{14}$ | P4 (64K_0R_0S) | NL-SAS | 1.38 | 1.28 | 0.33 |
| $o_{25}$ | P2 (8K_0R_100S) | SSD | 1.01 | 0.99 | 0.99 |
| $o_{26}$ | N/A | SSD | N/A | N/A | N/A |

1100-1

| OBJECT | DIFF GAIN SAS→SSD: $DG_{nij,(2\_1)}$ | DIFF GAIN NL-SAS→SAS: $DG_{nij,(3\_2)}$ | EARNING SAS→SSD: $E_{nij,(2\_1)}$ | EARNING NL-SAS→SAS: $E_{nij,(3\_2)}$ | TARGET STORAGE TIER |
|---|---|---|---|---|---|
| $o_{11}$ | 1.461 | 0.334 | 146.1 | 33.4 | SSD |
| $o_{12}$ | 0.02 | 0 | - | - | NLSAS |
| $o_{13}$ | 0.5 | 0.07 | 25 | 3.5 | NLSAS |
| $o_{14}$ | 0.1 | 0.95 | 7 | 66.5 | SAS |
| $o_{25}$ | 0.02 | 0 | - | - | NLSAS |
| $o_{26}$ | N/A | N/A | N/A | N/A | SSD |

| OBJECT | CURRENT STORAGE TIER | TARGET STORAGE TIER |
|---|---|---|
| $o_{11}$ | SAS | →SSD |
| $o_{12}$ | SAS | SAS |
| $o_{13}$ | NL-SAS | NL-SAS |
| $o_{14}$ | NL-SAS | →SAS |
| $o_{25}$ | SSD | SSD |
| $o_{26}$ | SSD | SSD |

FIG. 13D

DATA MOVEMENT BETWEEN STORAGE TIERS OF A CLUSTERED STORAGE SYSTEM BASED ON INPUT/OUTPUT PATTERNS OF STORAGE OBJECTS

RELATED APPLICATION

The present application claims priority to Chinese Patent Application No. 202210213889.6, filed on Mar. 4, 2022 and entitled "Data Movement Between Storage Tiers of a Clustered Storage System Based on Input/Output Patterns of Storage Objects," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for data movement between storage tiers of a clustered storage system based on input/output patterns of storage objects.

In one embodiment, an apparatus comprises at least one processing device comprising a processor coupled to a memory. The at least one processing device is configured to perform the step of classifying, based at least in part on monitoring input/output operations for a given storage object for a designated period of time, an input/output pattern associated with the given storage object, the given storage object being stored utilizing a first type of storage resources in a given one of two or more storage systems in a clustered storage system, the first type of storage resources being associated with a first one of two or more storage tiers in the clustered storage system. The at least one processing device is also configured to perform the step of identifying, for the classified input/output pattern, a performance difference between (i) utilizing the first type of storage resources associated with the first one of the two or more storage tiers in the clustered storage system and (ii) utilizing at least a second type of storage resources associated with at least a second one of the two or more storage tiers in the clustered storage system. The at least one processing device is further configured to perform the steps of determining, based at least in part on the identified performance difference, whether to move the given storage object from being stored utilizing the first type of storage resources associated with the first one of the two or more storage tiers in the clustered storage system to the second type of storage resources associated with the second one of the two or more storage tiers in the clustered storage system and moving, responsive to the determination, the given storage object to the second type of storage resources associated with the second one of the two or more storage tiers in the clustered storage system.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for data movement between storage tiers of a clustered storage system based on input/output patterns of storage objects in an illustrative embodiment.

FIG. 3 shows a plot of storage access data pattern trends in an illustrative embodiment.

FIG. 11 shows a table of performance differences and performance earnings for promotion of storage objects based on their associated input/output patterns in an illustrative embodiment.

FIGS. 13A-13D show examples of storage object relocation which does and does not take into account input/output patterns of storage objects in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
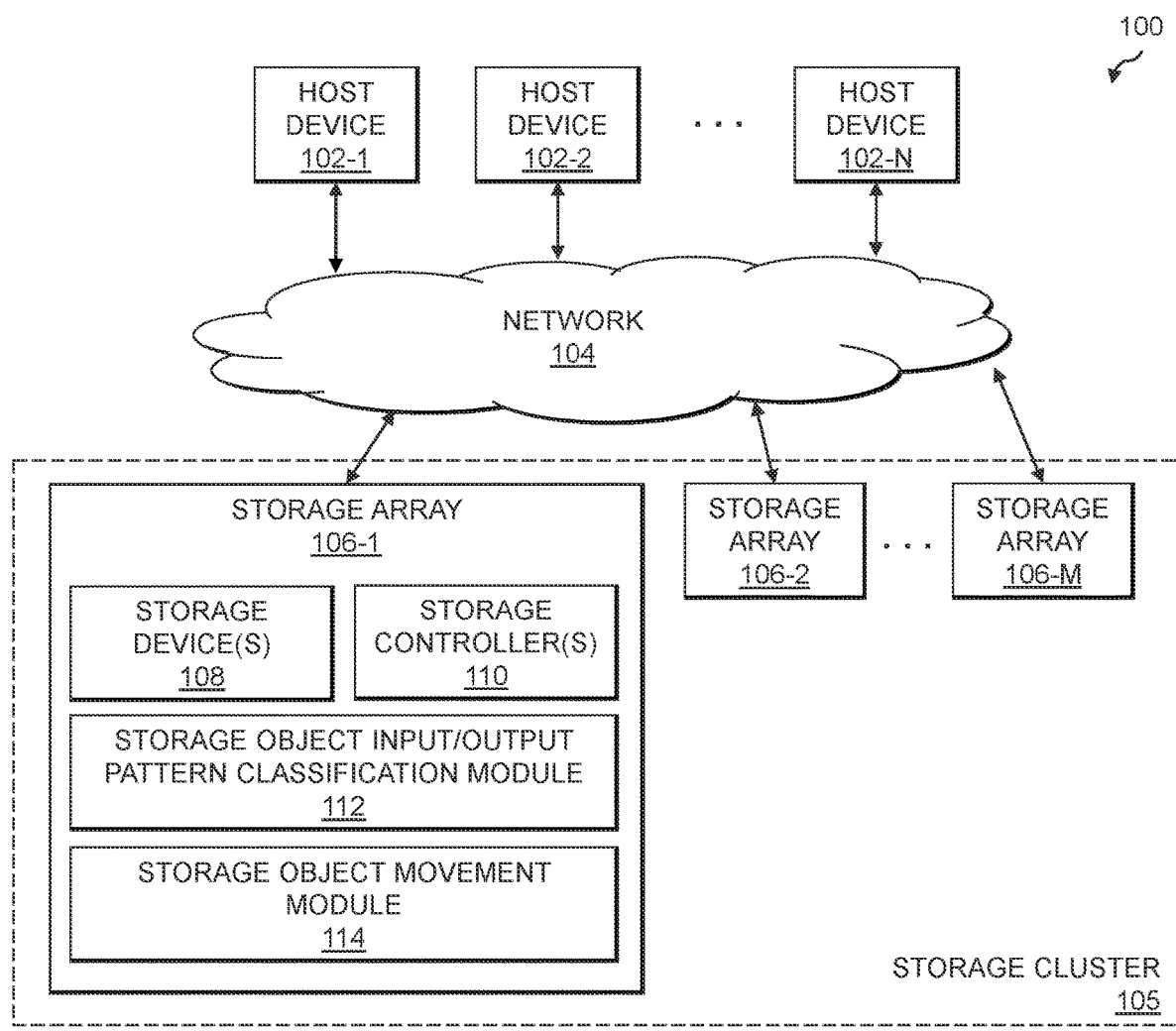
FIG. 1 is a block diagram of an information processing system for data movement between storage tiers of a clustered storage system based on input/output patterns of storage objects in an illustrative embodiment.

FIG. 1 shows an information processing system 100 configured in accordance with an illustrative embodiment to provide functionality for data movement between storage tiers of a clustered storage system based on input/output patterns of storage objects. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster 105. At least one of the storage controllers of the storage arrays 106 (e.g., the storage controller 110 of storage array 106-1) is assumed to implement functionality for intelligent data movement across the storage devices 108 of the storage array 106-1 (e.g., between different ones of the storage devices 108 or portions thereof that provide different storage tiers in the storage cluster 105), and between the storage array 106-1 and one or more other ones of the storage arrays 106-2 through 106-M. Such intelligent data movement functionality is provided via a storage object IO pattern classification module 112 and a storage object movement module 114.

As noted above, the storage arrays 106 in the FIG. 1 embodiment are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The storage object IO pattern classification module 112 is configured to classify the IO patterns of storage objects based on monitoring IO operations of the storage objects over a period of time. The IO patterns may be determined based on various criteria, including but not limited to size of the storage objects, read/write ratios for the storage objects, random/sequential ratios for the storage objects, etc. The storage object movement module 114 is configured to determine whether and where to relocate storage objects based at least in part on the classifications provided by the storage object IO pattern classification module 112. For example, performance differences for different storage tiers of the storage cluster 105 may be identified for each IO pattern (e.g., the identified performance differences characterizing how storage objects exhibiting a particular IO pattern perform on different storage tiers of the storage cluster 105). Based on such identified differences for the IO patterns, the storage object movement module 114 will determine whether storage objects should be moved among storage tiers of the storage cluster 105. The storage object movement module 114 will then move storage objects based on such determinations, where such movement may be intra-storage array or inter-storage array as described elsewhere herein.

Although in the FIG. 1 embodiment the storage object IO pattern classification module 112 and the storage object movement module 114 are shown as being implemented internal to the storage array 106-1 and outside the storage controllers 110, in other embodiments one or both of the storage object IO pattern classification module 112 and the storage object movement module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the storage object IO pattern classification module 112 and the storage object movement module 114.

At least portions of the functionality of the storage object IO pattern classification module 112 and the storage object movement module 114 may be implemented at least in part in the form of software that is stored in memory and executed by a processor.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 14 and 15.

It is to be understood that the particular set of elements shown in FIG. 1 for data movement between storage tiers of a clustered storage system based on input/output patterns of storage objects is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for data movement between storage tiers of a clustered storage system based on input/output patterns of storage objects will now be described in more detail with reference to the flow diagram of FIG. 2. It is to be understood that this particular process is only an example, and that additional or alternative processes for data movement between storage tiers of a clustered storage system based on input/output patterns of storage objects may be used in other embodiments.

In this embodiment, the process includes steps 200 through 206. These steps are assumed to be performed by the storage object TO pattern classification module 112 and the storage object movement module 114. The process begins with step 200, classifying, based at least in part on monitoring TO operations for a given storage object for a designated period of time, an TO pattern associated with the given storage object. The given storage object is stored utilizing a first type of storage resources in a given one of two or more storage systems in a clustered storage system, the first type of storage resources being associated with a first one of two or more storage tiers in the clustered storage system. Step 200 may be based at least in part on a size of the given storage object, a ratio of read operations to write operations for the given storage object for the designated period of time, and a ratio of sequential TO operations to random TO operations involving the given storage object for the designated period of time.

In step 202, a performance difference between (i) utilizing the first type of storage resources associated with the first one of the two or more storage tiers in the clustered storage system and (ii) utilizing at least a second type of storage resources associated with at least a second one of the two or more storage tiers in the clustered storage system is identified for the classified IO pattern. Step 202 may comprise evaluating a first performance of a first set of one or more storage objects having the classified TO pattern that are stored utilizing the first type of storage resources associated with the first one of the two or more storage tiers in the clustered storage system, and evaluating a second performance of a second set of one or more storage objects having the classified TO pattern that are stored utilizing the second type of storage resources associated with the second one of the two or more storage tiers in the clustered storage system. The first performance and second performance may be characterized by a set of performance metrics, the set of performance metrics comprising a bandwidth metric, an TO operations per second (IOPS) metric, and a response time metric.

A determination is made in step 204, based at least in part on the identified performance difference, whether to move the given storage object from being stored utilizing the first type of storage resources associated with the first one of the two or more storage tiers in the clustered storage system to the second type of storage resources associated with the second one of the two or more storage tiers in the clustered storage system. Determining whether to move the given storage object from being stored utilizing the first type of storage resources associated with the first one of the two or more storage tiers in the clustered storage system to the second type of storage resources associated with the second one of the two or more storage tiers in the clustered storage system in step 204 may be further based at least in part on an IO activity level of the given storage object for the designated period of time. The IO activity level of the given storage object for the designated period of time may be determined based on a count of the monitored input/output operations for the given storage object for the designated period of time.

The given storage object is moved in step 206 to the second type of storage resources associated with the second one of the two or more storage tiers in the clustered storage system responsive to the step 204 determination. Step 206 may comprise moving the given storage object from storage resources of the first type on the given storage system to storage resources of the second type on the given storage system responsive to determining that the given storage system has sufficient available storage resources of the second type for storage of the given storage object, and moving the given storage object from storage resources of the first type on the given storage system to storage resources of the second type on another one of the two or more storage systems in the clustered storage system responsive to determining that the given storage system does not have sufficient available storage resources of the second type for storage of the given storage object. The other one of the two or more storage systems is selected based at least in part on respective amounts of available storage resources of the second type on each of the two or more storage system in the clustered storage system.

In some embodiments, the first one of the two or more storage tiers in the clustered storage system provides a first performance level that is greater than a second performance level provided by the second one of the two or more storage tiers in the clustered storage system, and step 206 is performed responsive to the identified performance difference being less than a designated threshold. The designated threshold may be set based at least in part on: an acceptable performance loss between the first performance level of the first one of the two or more storage tiers in the clustered storage system and the second performance level of the second one of the two or more storage tiers in the clustered storage system; and a cost associated with movement of the given storage object from the first one of two or more storage tiers in the clustered storage system to the second one of the two or more storage tiers in the clustered storage system.

In other embodiments, the first one of the two or more storage tiers in the clustered storage system provides a first performance level that is less than a second performance level provided by the second one of the two or more storage tiers in the clustered storage system, and step 206 is performed responsive to the identified performance difference being greater than a designated threshold. The designated threshold may be set based at least in part on: a performance gain between the first performance level of the first one of the two or more storage tiers in the clustered storage system and the second performance level of the second one of the two or more storage tiers in the clustered storage system; and a cost associated with movement of the given storage object from the first one of two or more storage tiers in the clustered storage system to the second one of the two or more storage tiers in the clustered storage system.

In a data center or other type of IT infrastructure including cloud computing platforms, there may be many different storage arrays each with their own characteristics and advantages for different types of workloads. For example, a data center associated with a business or other enterprise may offer comprehensive services to customers or other users with high quality through leveraging the different characteristics of such storage arrays, including different characteristics of storage devices within each of the storage arrays. In some cases, storage arrays are part of a clustered storage system (also referred to herein as a storage cluster, a storage array cluster or an array cluster).

At the array cluster level, as business needs change, the "hot degree" of different data may be changing continuously. The hot degree or IO temperature may characterize data access frequency (e.g., a number of IO requests within a designated threshold of a current time), or other types of IO metrics. Because of such changes in hot degree, data that currently resides on a high performance storage array may become cold while data which resides on a low performance storage array may become hot. To optimize performance, there is thus a need for self-service data movement between different arrays in an array cluster (e.g., according to data access frequency). Such self-service data movement may include breaking the barrier among storage arrays in the array cluster, moving hot data to high performance storage arrays, archiving cold data to lower performance storage arrays, etc. This advantageously provides various benefits to the customers or other end-users (e.g., increasing performance, reducing cost, improving storage utilization efficiency and speeding up customer business processing in the array cluster, etc.).

For some storage arrays and array clusters, data movement functionality may be used to extend storage tiering among different storage arrays or platforms and cloud storage platforms, to move data among heterogeneous storage resources, to fully utilize storage resources at the storage cluster level and possibly across data centers, etc. In some storage arrays, such data movement functionality may include Fully Automated Storage Tiering (FAST) technology, as well as extensions thereof referred to as FAST Sideways or FAST.X. For example, a Dell EMC VMAX storage array may implement FAST hinting, which provides users with a way to accelerate mission critical processes based on business priority and other service level objectives (SLOs). FAST hinting is advantageously application aware, and leverages storage and performance analyzers to monitor the read and write status of different workloads to send hints to storage arrays for data that is likely to be accessed in a given period of time. An IT administrator may create FAST hint profiles, which are given a priority and scheduled one-off, ongoing, or on a recurring frequency (e.g., daily, weekly, monthly, etc.) along with an expected execution duration. Such hints may be provided via an analytics tab of analytics software of a storage array (e.g., a database storage analyzer interface in Unisphere for a VMAX array).

Based on provided hints, a performance analyzer can watch for increased workload demands before taking action. For example, FAST can receive hints from a database storage analyzer through a hint manager application programming interface (API) and proactively adjust the storage device mix according to a priority set (e.g., a mix of flash and serial attached SCSI (SAS) storage devices). The storage device mix may be automatically adjusted, and is subject to keeping SLOs intact and does not override previous SLOs. FAST or other data movement functionality provides capabilities for delivering leading edge application-aware functionality for customers or end-users that require the best response times for mission-critical applications in specific business periods.

In addition to optimization through FAST hinting, data services may also extend beyond a storage array itself and across the data center through FAST.X. FAST.X advantageously evolves and extends storage tiering and service-level management to other storage platforms as well as cloud storage. FAST.X enables data movement across storage technologies provided by various block devices (e.g., including Dell EMC XtremIO, VNX, CloudArray and other types of storage). FAST.X simplifies management and operations, and consolidates heterogeneous storage under its control. FAST.X further extends SLO management to external storage arrays as well. Enabling SLO management across external storage arrays enables easy integration for different appliances as needed by different workloads and requirements. FAST.X may simplify management at scale, providing workload optimization across storage arrays with the same simplicity as internal SLO provisioning. The advanced automation of FAST optimizes customer or other end-user workloads to automatically apply the necessary amounts of resources, and FAST.X extends this capability to external storage arrays according to the same specified performance and availability criteria. As noted above, FAST.X may also be integrated with cloud storage, such as to move less active workloads to more cost-efficient cloud storage.

As discussed above, FAST.X technology may be used to extend storage tiering among different storage platforms and the cloud, enabling movement of data among heterogeneous storage to more fully utilize storage resources at a storage cluster level and even at a data center level. FAST.X technology may be used to move "hot" data (e.g., data with high access frequency) to high performance storage arrays, while "cold" data (e.g., data with low access frequency) is archived to cost-saving lower performance storage arrays. This can provide significant benefits to end-users, improving storage system utilization efficiency and speeding up end-user processing in a storage cluster.

Illustrative embodiments provide techniques that improve the efficiency of FAST.X and other types of storage object relocation mechanisms (e.g., for both intra- and inter-storage array data movement) by determining and taking into account IO pattern performance differences among multiple storage tiers of a storage array cluster during storage object relocation selection. Advantageously, some embodiments take into account both IO pattern performance differences and IO access frequency of storage objects during storage object relocation selection. Thus, some embodiments choose storage objects with associated IO patterns that have bigger performance improvements to promote over storage objects with IO patterns that do not have or have limited performance differences between neighboring or different storage tiers. Further, the storage objects with IO patterns that do not have or have limited performance differences on neighboring or different storage tiers may be selected for demotion to lower storage tiers. In this way, some embodiments ensure that storage objects which are moved to a higher storage tier will provide at least some designated threshold performance improvements, while storage objects moved to a lower storage tier will experience no or minimal performance loss while saving costs (e.g., by moving such data from a higher and more costly storage tier to a lower and less costly storage tier). The storage array cluster IO performance (e.g., including FAST.X data movement performance) will be improved greatly, while also improving storage cluster efficiency.

Different applications may run storage workloads having varying IO characteristics. Thus, to analyze and tune performance of a storage system, it is important to understand the types of storage workloads that applications or hosts utilizing the storage system are generating. Storage workloads may be described in terms of various characteristics, including but not limited to IO size, read/write ratio, random/sequential ratio, etc. FIG. 3 shows a table 300 illustrating various examples of applications and their associated storage workload characteristics (e.g., IO size, read/write ratio and random/sequential ratio). Such applications include: a web file server, a web server log, operating system (OS) paging, exchange server, workstation, media streaming, online transaction processing (OLTP) data, and OLTP logging. The web file server application, for example, may have an IO size of 4 kilobytes (KB), 8 KB or 64 KB, with a read/write ratio of 95% read and 5% write, and a random/sequential ratio of 75% random and 25% sequential. As another example, the OLTP logging application may have an IO size of 512 bytes (B) to 64 KB, a read/write ratio of 100% write, and a random/sequential ratio of 100% random. It should be noted that the particular applications and their associated storage workload characteristics shown in the table 300 of FIG. 3 are presented by way of example only, and that in other embodiments there may be various other types of applications that utilize storage systems, the applications listed in the table 300 of FIG. 3 may have different values for their associated storage workload characteristics, etc.

Figure 4A:
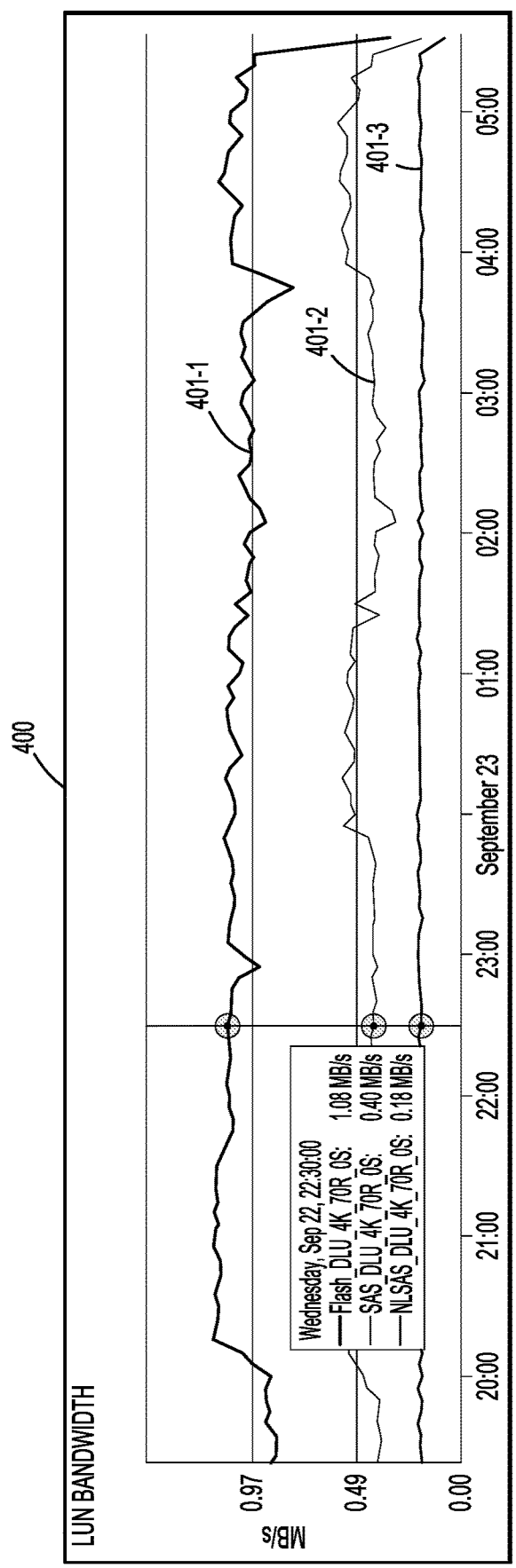
FIGS. 4A-4C show plots of different performance metrics for storage objects with a first input/output pattern stored on different storage tiers in an illustrative embodiment.
Figure 4B:
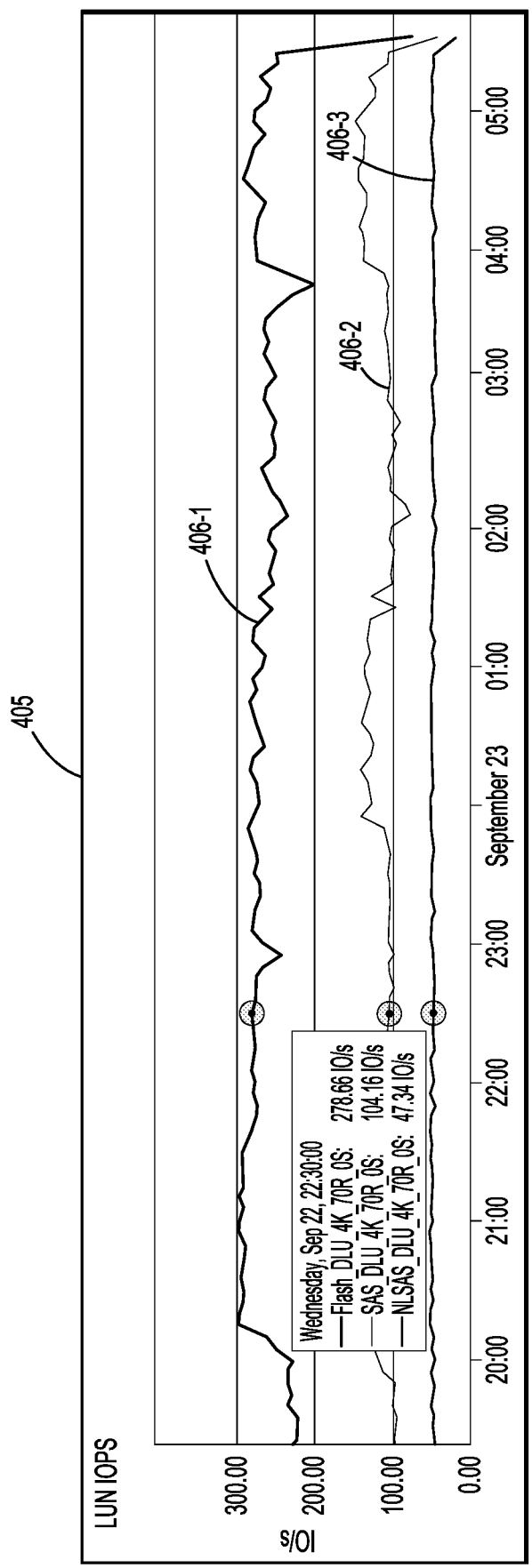
Figure 4C:
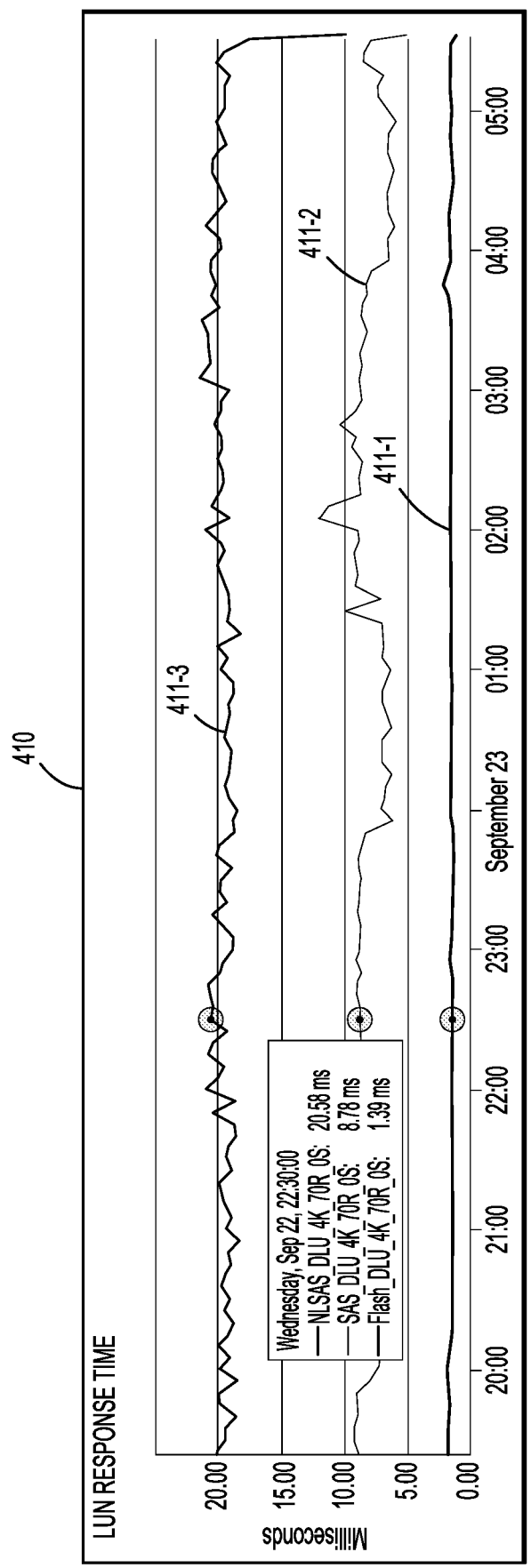
Figure 5A:
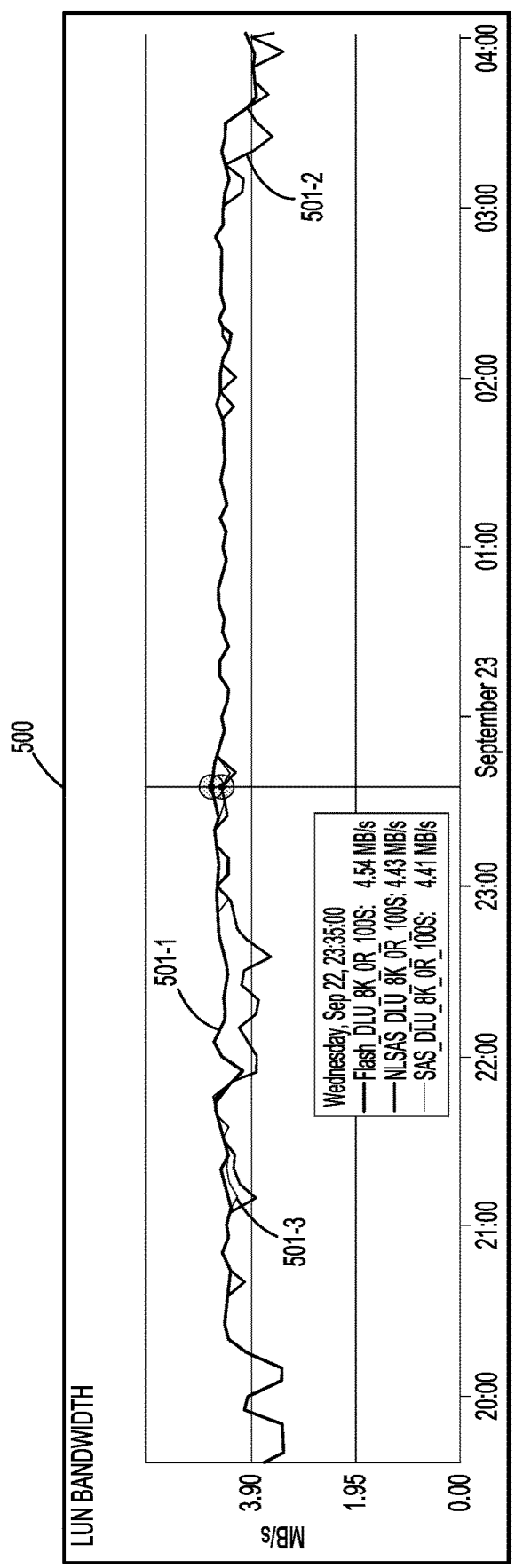
FIGS. 5A-5C show plots of different performance metrics for storage objects with a second input/output pattern stored on different storage tiers in an illustrative embodiment.
Figure 5B:
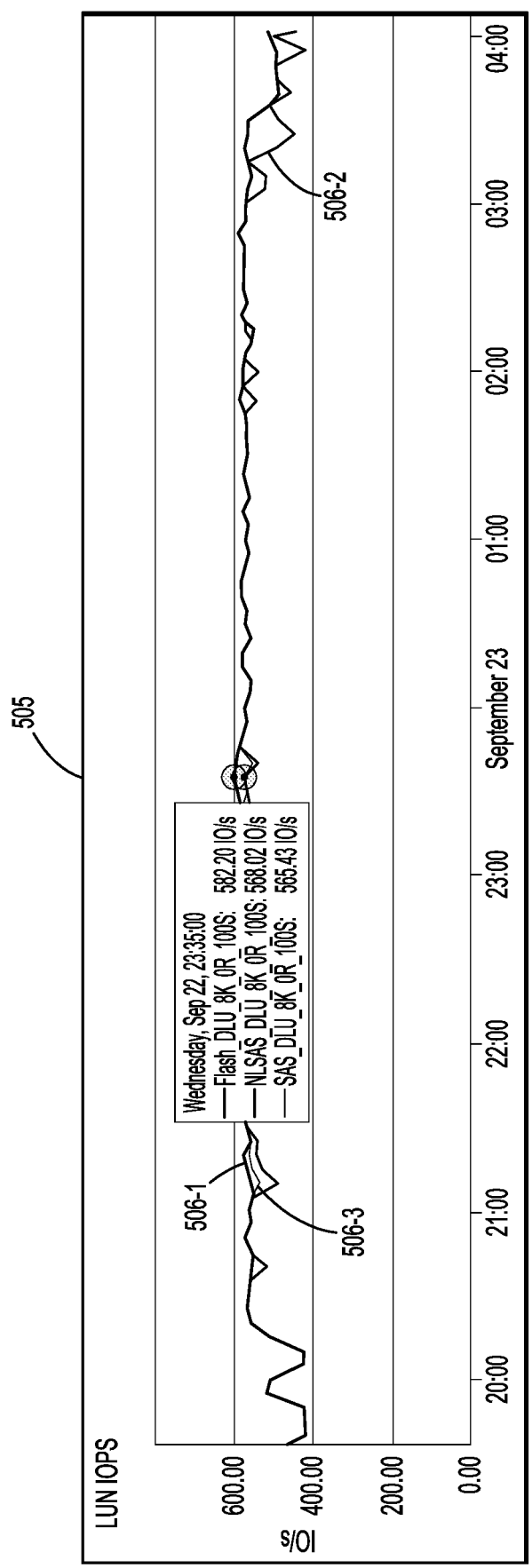
Figure 5C:
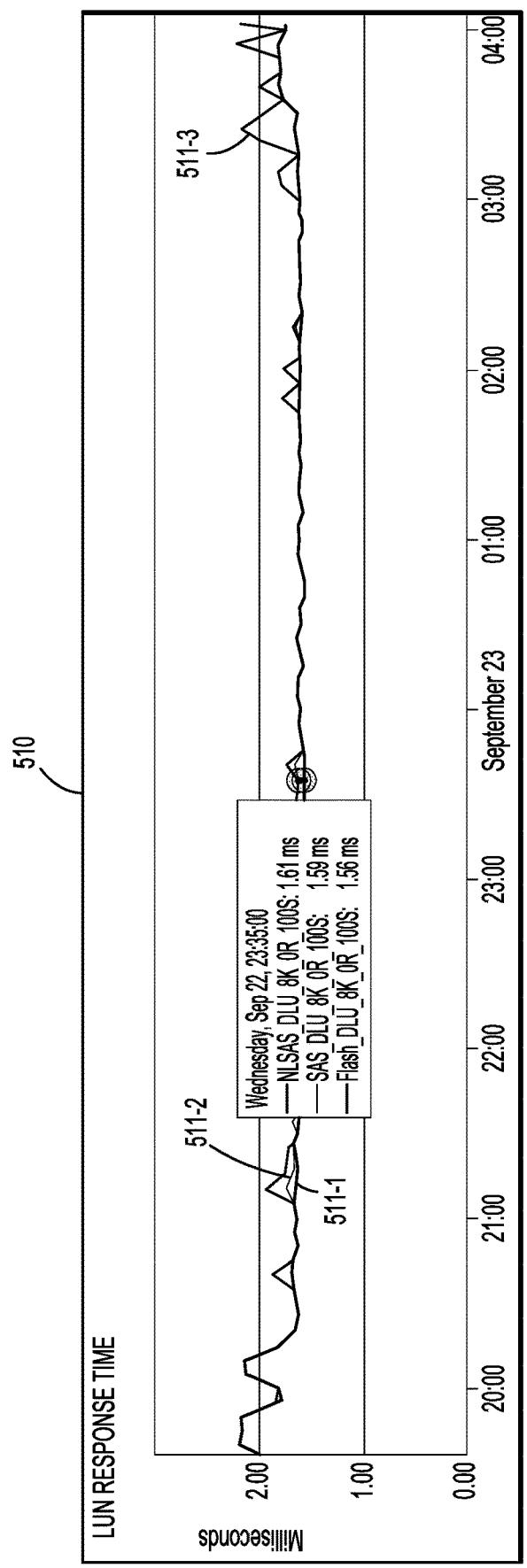
Figure 6A:
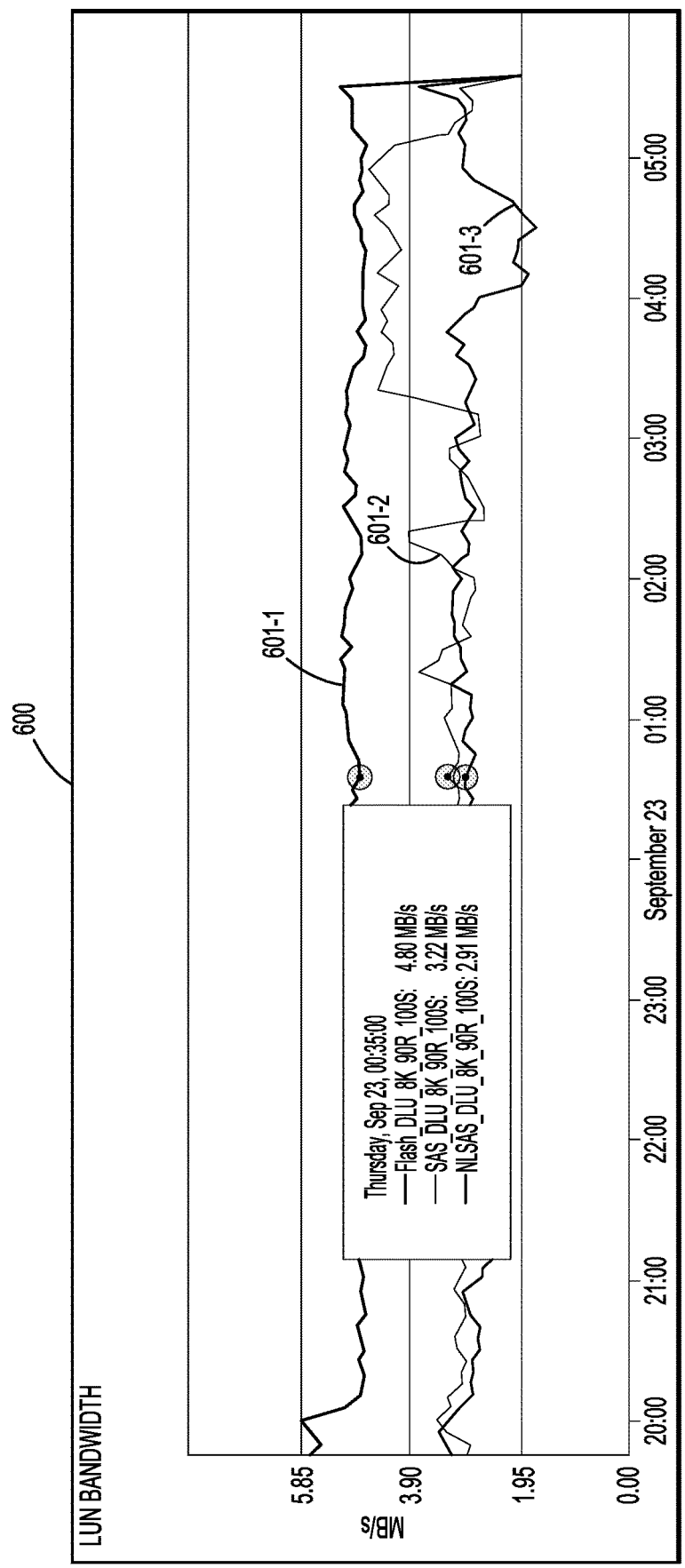
FIGS. 6A-6C show plots of different performance metrics for storage objects with a third input/output pattern stored on different storage tiers in an illustrative embodiment.
Figure 6B:
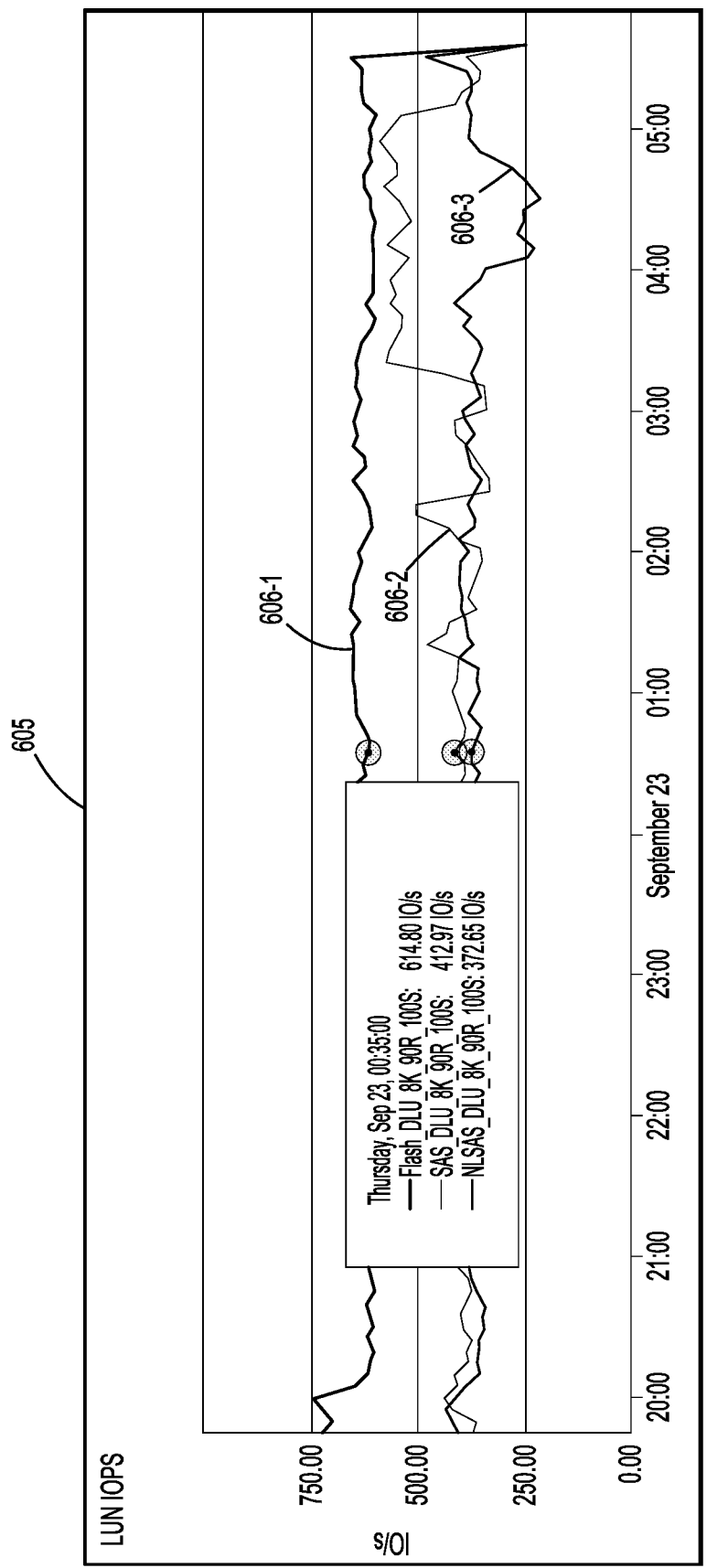
Figure 6C:
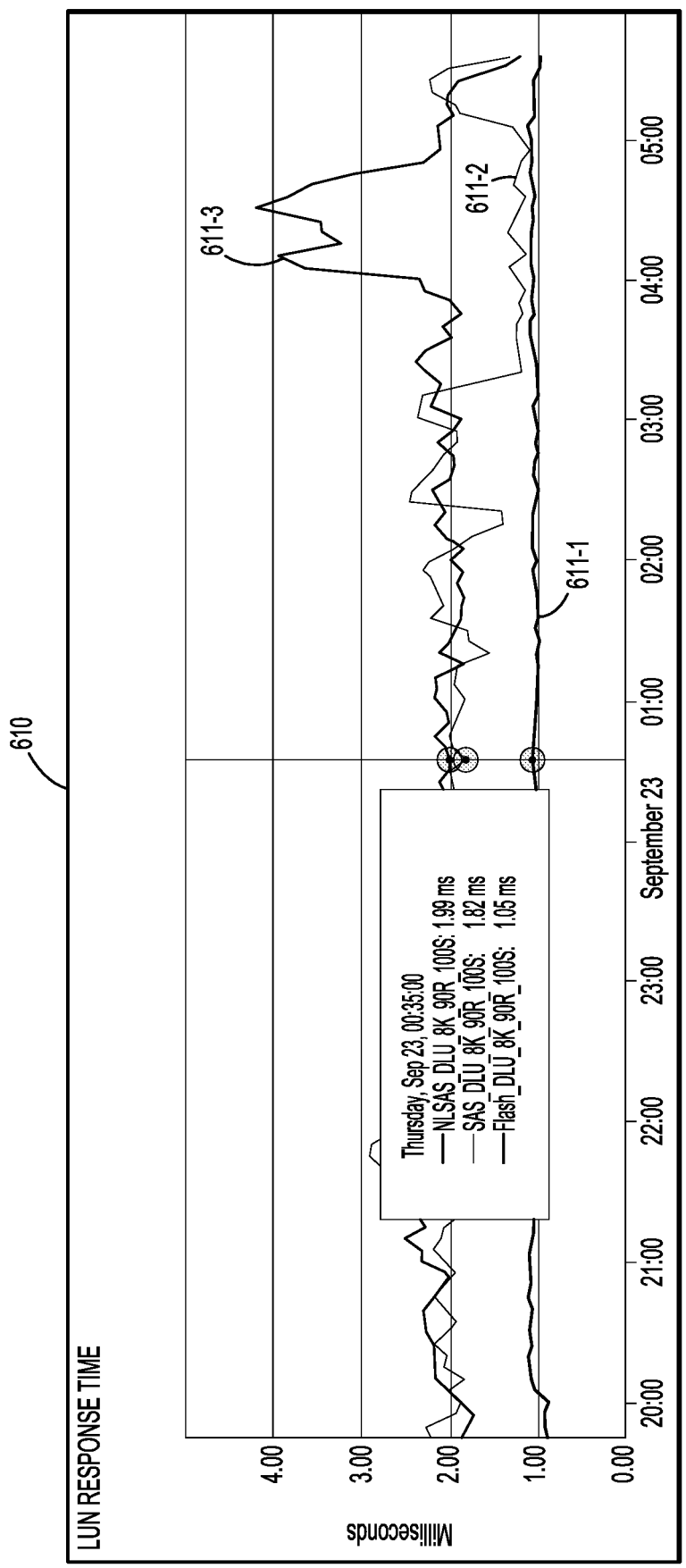
Figure 7A:
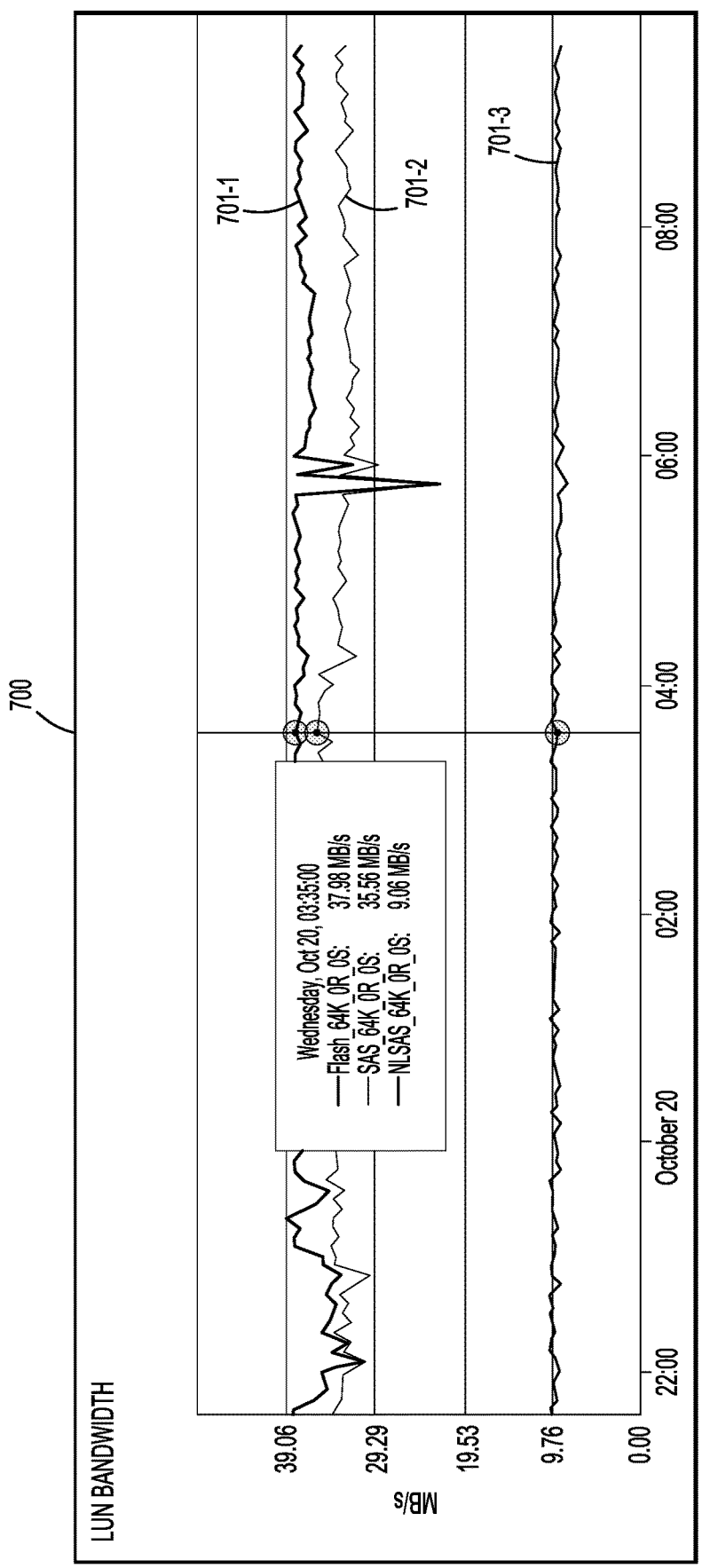
FIGS. 7A-7C show plots of different performance metrics for storage objects with a fourth input/output pattern stored on different storage tiers in an illustrative embodiment.
Figure 7B:
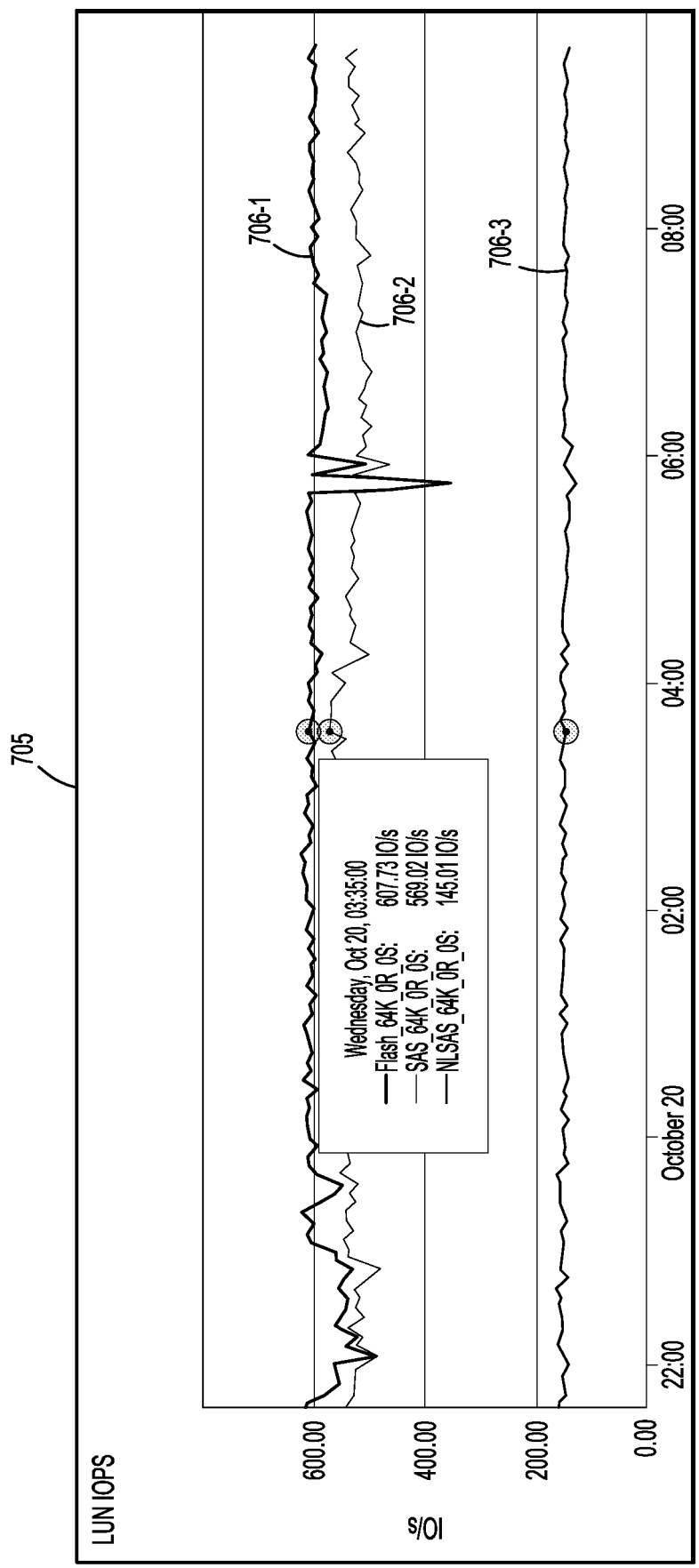
Figure 7C:
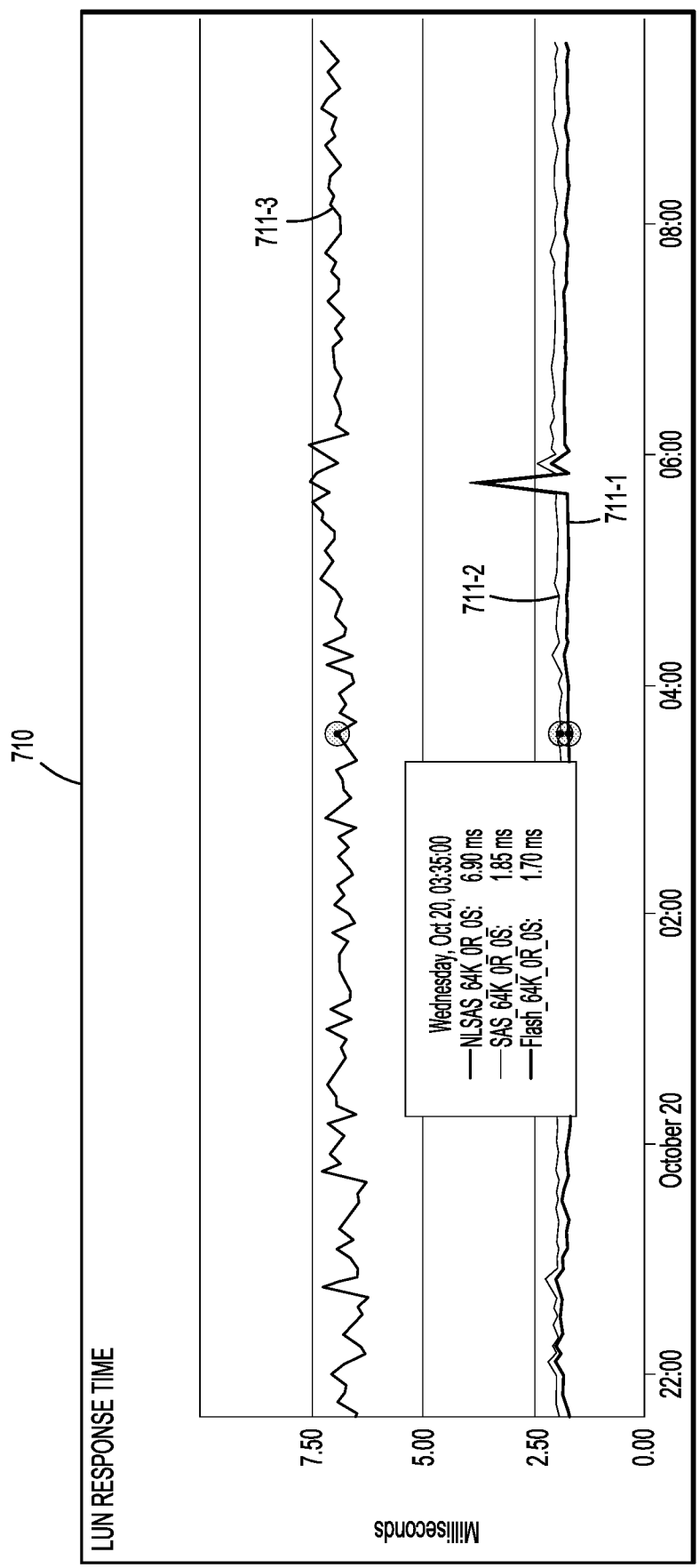

Performance metrics, such as bandwidth, IO operations per second (IOPS) and response time, are illustrated in FIGS. 4A-7C for different IO patterns. FIGS. 4A-4C show plots 400, 405 and 410, respectively, for storage objects on an SSD storage tier, an SAS storage tier, and a near line SAS (NL-SAS) storage tier for an IO pattern with a 4 KB IO size, a 70%/30% read/write ratio, and a 100%/0% random/sequential ratio (denoted "4K_70R_S" and also referred to herein as IO pattern P1). FIGS. 5A-5C show plots 500, 505 and 510, respectively, for storage objects on an SSD storage tier, an SAS storage tier, and an NL-SAS storage tier for an IO pattern with an 8 KB IO size, a 0%/100% read/write ratio, and a 0%/100% random/sequential ratio (denoted "8K_0R_100S" and also referred to herein as IO pattern P2). FIGS. 6A-6C show plots 600, 605 and 610, respectively, for storage objects on an SSD storage tier, an SAS storage tier, and an NL-SAS storage tier for an IO pattern with an 8 KB IO size, a 90%/10% read/write ratio, and a 100%/0% random/sequential ratio (denoted "8K_90R_0S" and also referred to herein as IO pattern P3). FIGS. 7A-7C show plots 700, 705 and 710, respectively, for storage objects on an SSD storage tier, an SAS storage tier, and an NL-SAS storage tier for an IO pattern with a 64 KB IO size, a 0%/100% read/write ratio, and a 0%/100% random/sequential ratio (denoted "64K_0R_0S" and also referred to herein as IO pattern P4).

The plots 400, 500, 600 and 700 illustrate LUN bandwidth (megabytes per second (MB/s)) versus time for the storage objects stored on the SSD (e.g., lines 401-1, 501-1, 601-1, 701-1), SAS (e.g., lines 401-2, 501-2, 601-2, 701-2) and NL-SAS (e.g., lines 401-3, 501-3, 601-3, 701-3) storage tiers. The plots 405, 505, 605 and 705 illustrate LUN IOPS (IO per second (IO/s)) versus time for the storage objects stored on the SSD (e.g., lines 406-1, 506-1, 606-1, 706-1), SAS (e.g., lines 406-2, 506-2, 606-2, 706-2) and NL-SAS (e.g., lines 406-3, 506-3, 606-3, 706-3) storage tiers. The plots 410, 510, 610 and 710 illustrate LUN response time (milliseconds (ms)) versus time for the storage objects stored on the SSD (e.g., lines 411-1, 511-1, 611-1, 711-1), SAS (e.g., lines 411-2, 511-2, 611-2, 711-2) and NL-SAS (e.g., lines 411-3, 511-3, 611-3, 711-3) storage tiers.

Figure 8:
FIG. 8 shows a table summarizing performance metrics for storage objects with the first through fourth input/output patterns stored on different storage tiers in an illustrative embodiment.

FIG. 8 shows a table 800 illustrating the performance ratios for the IO patterns illustrated in FIGS. 4A-7C. As can be seen from the plots of FIGS. 4A-7C and the table 800 of FIG. 8, different IO patterns have different performance behaviors for different storage tiers. The 4K_70R_0S IO pattern, for example, has relatively large performance differences among the SSD, SAS and NL-SAS storage tiers (5.26:2.21:1). The 8K_0R_100S IO pattern, however, has relatively small performance differences among the SSD, SAS and NL-SAS storage tiers (1.01:1:1). Random and small IO operations may have bigger performance differences among the storage tiers, while sequential and large IO may have smaller performance differences among the storage tiers.

Data relocation algorithms (e.g., such as FAST.X) which are based on storage object IO activity do not consider the impact of IO patterns of storage objects on performance (e.g., including whether there are differences in performance for different storage tiers). As detailed above, however, different IO patterns have different performance results for different storage tiers. For data with IO patterns having small performance differences among storage tiers, relocation of that data does not significantly improve system performance. In other words, some data will get similar performance on two or more storage tiers (e.g., data stored on SAS or NL-SAS storage tiers may achieve similar performance when stored on an SSD storage tier). Thus, such data may be stored on lower cost storage tiers (e.g., SAS or NL-SAS) instead of higher cost storage tiers (e.g., SSD), with little to no impact on overall system performance.

As noted above, different IO patterns may exhibit different performance behavior on different storage tiers. Some IO patterns have similar performance results across multiple different storage tiers, while other IO patterns may exhibit improved performance on certain storage tiers. Data relocation mechanisms which take into account only IO activity may result in movement of data among storage tiers where such movement provides little to no performance benefit. In illustrative embodiments, the IO pattern is considered along with IO activity to ensure that storage object or data relocation operations provide some threshold performance benefit. Illustrative embodiments also enable data relocation to lower cost storage tiers to free up storage space on higher cost storage tiers, without necessarily impacting overall system performance.

In some embodiments, a data relocation algorithm is used which considers both access frequency and data access patterns to calculate performance earnings or improvement which may be achieved via data relocation operations. The data relocation operations can therefore promote data which has high performance earnings to higher storage tiers, and demote data with no or minimal performance earnings or penalty to lower storage tiers without significantly affecting overall system performance. Through consideration of both access frequency and data access patterns, some embodiments can determine an appropriate storage tier and storage array of a multi-tier storage array cluster to which different data should be relocated, both for improving overall system performance and cost efficiency.

For storage objects with IO patterns that have a small performance difference (e.g., less than some designated threshold) between two or more different storage tiers (e.g., "neighboring" storage tiers), relocation from a first one (e.g., a lower storage tier) of the two or more different storage tiers to a second one (e.g., a higher storage tier) of the two or more different storage tiers provides no or minimal performance gains such that relocation of such storage objects from the first storage tier to the second storage tier is avoided. Similarly, to free up resources on the second storage tier (e.g., the higher storage tier), storage objects that have a small or minimal performance difference between the first storage tier and the second storage tier may be moved from the second storage tier (e.g., the higher storage tier) to the first storage tier (e.g., the lower storage tier). For example, space can be freed up on an SSD storage tier by moving storage objects to a lower SAS or NL-SAS storage tier (e.g., where such storage objects exhibit no or minimal performance differences between the SSD and SAS or NL-SAS storage tiers). For those storage objects having IO patterns with significant performance differences (e.g., greater than some designated threshold) between two or more different storage tiers (e.g., "neighboring" storage tiers), such storage objects may be relocated from the first storage tier (e.g., the lower storage tier) to the second storage tier (e.g., the higher storage tier), or vice versa, based on the IO activity level and performance gains achieved from such storage object relocation. Advantageously, such improved storage object relocation can improve the overall throughput of a storage array cluster having multiple different storage tiers.

Advantageously, some embodiments adjust storage object relocation mechanisms (e.g., FAST.X relocation mechanisms) to consider performance impacts associated with moving storage objects exhibiting different IO patterns. For example, storage objects may be classified based on their associated IO patterns into those which do and do not benefit (e.g., provide at least a designated threshold performance improvement) from relocation among two or more different storage tiers. In some embodiments, IO patterns are only taken into account if they are determined to have some threshold stability (e.g., over some designated period of time). For storage objects with stable IO patterns, the performance differences among different storage tiers (e.g., neighboring storage tiers) are considered. The performance "earnings" (e.g., performance gain or penalty) between two or more different storage tiers is calculated, and then combined with determined IO activity or other metrics to determine whether and where to relocate storage objects.

In the description below, storage relocation is assumed to be performed on a storage array cluster with N storage arrays in which storage resources are arranged into three storage tiers: tier 1 (an extreme performance tier utilizing one or more of SAS flash, SSD, and NVMe drives); tier 2 (a performance tier utilizing SAS drives); and tier 3 (a capacity tier utilizing NL-SAS drives, low cost cloud storage, or combinations thereof). It should be appreciated, however, that in other embodiments a storage array cluster may have more or fewer than three storage tiers. Storage objects (e.g., LUNs, filesystems, data stores, etc.) may be configured for a special usage point by an end-user, and may be used by one or more designated applications. Such applications are assumed to have specific IO patterns, where at least some of those IO patterns are relatively stable (e.g., do not change more than some designated threshold over at least some designated threshold period of time). The IO patterns for the storage objects can thus be statistically analyzed to determine whether migration of such storage objects across the storage tiers of the storage array cluster provides a significant performance bonus or penalty (e.g., at least some threshold performance difference).

The following notation will be used in the description below. T is used to denote an IO pattern collection period, N is used to denote the total number of storage arrays in a storage array cluster, and I is used to denote the total number of storage objects (e.g., a FAST.X relocation unit) in a storage array cluster. $o_{ni}$ denotes a storage object i on storage array n, where $1 \leq i \leq I$, and $1 \leq n \leq N$. J denotes the total number of IO patterns in the storage array cluster, $P_j$ denotes an IO pattern j, $P_{ni,j}$ denotes the IO pattern for storage object $o_{ni}$, where $1 \leq j \leq J$ and $J \leq I$. $RP_{ni,j}$ denotes the IO pattern ratio, where $RP_{ni,j} = P_{ni,j}/\text{sum}(P_{ni,j})$. $\theta$ denotes a threshold IO pattern ratio, where if $RP_{ni,j} > \theta$, then the storage object $o_{ni}$ has IO pattern $P_{ni,j}$, and if $RP_{ni,j} < \theta$, then the storage object $o_{ni}$ has a random or non-stable IO pattern. K denotes the total number of storage tiers in the storage array cluster, and k denotes one of the storage tiers in K, with $1 \leq k \leq K$. In some embodiments, it is assumed that K=3, where k=1 is an extreme performance storage tier, k=2 is a performance storage tier, and k=3 is a capacity storage tier.

$C_{Bj,k}$ denotes a bandwidth criteria for IO pattern $P_j$ on storage tier k, and $NC_{Bj,k}$ denotes the normalization of the bandwidth criteria, where $$NC_{Bj,k<} = \frac{C_{Bj,k}}{\sum_{k=1}^{K} C_{Bj,k}}.$$

$C_{ij,k}$ denotes an IOPS criteria for IO pattern $P_j$ on storage tier k, and $NC_{ij,k}$ denotes the normalization of IOPS criteria, where $$NC_{Ij,k} = \frac{C_{Ij,k}}{\sum_{k=1}^{K} C_{Ij,k}}.$$

$C_{Rj,k}$ denotes a response time criteria for IO pattern $P_j$ on storage tier k, and $NC_{Rj,k}$ denotes the normalization of the response time criteria, where $$NC_{Rj,k} = \frac{1/C_{Rj,k}}{\sum_{k=1}^{K} 1/C_{Rj,k}}.$$

It should be noted that response time is a reverse indicator, where a smaller response time is better so the response time is inversed to calculate the normalization of the response time criteria.

$G_{j,k}$ denotes the comprehensive performance of IO pattern $P_j$ on storage tier k, where $G_{j,k} = NC_{Bj,k} + NC_{ij,k} + NC_{Rj,k}$. $DG_{j,(k\_k+1)}$ denotes the comprehensive performance difference gain (or penalty) of the IO pattern $P_j$ between neighboring storage tiers k and k+1, where $DG_{j,(k\_k+1)} = G_{j,k} - G_{j,k+1}$. $\theta_{G\_diff}$ denotes a threshold of performance gain for pattern $P_j$ between neighboring storage tiers k and k+1. $c_{ni}$ denotes the IO access count of storage object i on storage array n. $E_{nij,(k\_k+1)}$ denotes the performance earning for storage object $o_{ni}$ achieved by promoting the storage object $o_{ni}$ from storage tier k+1 to storage tier k, where $E_{nij,(k\_k+1)}$ combines IO activity and IO pattern criteria, $E_{nij(k\_k+1)} = c_{ni} * DG_{nij,(k\_k+1)}$.

To begin, the IO patterns of storage objects on a storage array cluster are recognized. The IO patterns are collected in the storage array cluster for a last period T, to recognize storage object IO patterns in a statistical way. Through analyzing historical IO statistics for storage objects over period T, the IO pattern types of the storage objects may be determined based on a set of factors or criteria including the IO size ($P_{size}$), IO read/write ratio ($P_{rw}$), and IO sequential/random ratio ($P_{sr}$). A storage object's IO size and IO read/write ratio may be obtained from a storage system or storage array metrics data. Sequential IO operations have starting storage locations (e.g., logical block addresses (LBAs)) which follow directly from preceding IO operations, and random IO operations have starting storage locations (e.g., LBAs) which are not contiguous (e.g., the starting LBA for an IO operation does not follow directly from the last LBA of a preceding IO operation). To determine the IO sequential/random ratio, a statistical calculation is performed where the total number of IO operations during period T is $N_{total}$, the sequential IO number is $N_s$, the random IO number is $N_r$, and the sequential ratio is $P_{sr} = N_s/N_{total}$.

The IO pattern for a storage object may be defined with a format of IOSize-IOReadRatio-IOSequentialRatio. The storage object $o_{ni}$ may exhibit different kinds of IO patterns, and for each type of IO pattern, the ratio of IO pattern is determined $P_{ni,j}:RP_{ni,j} = P_{ni,j}/\text{sum}(P_{ni,j})$. If the threshold IO pattern ratio is $\theta$, the storage objects can be classified as one of two types:

1. If $RP_{ni,j} < \theta$, then the storage object $o_{ni}$ has discrete IO patterns, and the storage objects' IO patterns are not stable and change irregularly;

2. If the $RP_{ni,j} > \theta$, then the storage object $o_{ni}$ has a stable IO pattern $P_{ni,j}$.

For storage objects of type (1), the IO access frequency is used for determining whether and where to relocate the storage objects. For storage objects of type (2), the IO access frequency is used along with considering the storage objects' specific IO pattern $P_j$ to analyze the performance gain or penalty which will be achieved as a result of relocation of the storage objects.

Each type of IO patterns' performance difference among the different storage tiers of the storage array cluster is then measured. In some embodiments, bandwidth, IOPS and response time criteria are used to evaluate an IO pattern's performance difference for different storage tiers. Let $C_{Bj,k}$ be the bandwidth on storage tier k of IO pattern $P_j$, let $C_{ij,k}$ be the IOPS on storage tier k of IO pattern $P_j$, and let $C_{Rj,k}$ be the response time on storage tier k of IO pattern $P_j$. These criteria have different units, so they may be normalized first before measuring the IO pattern $P_j$'s performance result on different storage tiers.

The bandwidth and IOPS criteria are positive indicators for performance, where bigger values for bandwidth and IOPS correspond to better performance for the IO pattern $P_j$. The bandwidth and IOPS criteria are normalized as follows:

$$NC_{Bj,k} = \frac{C_{Bj,k}}{\sum_{k=1}^{K} C_{Bj,k}} \text{ and } NC_{Ij,k} = \frac{C_{Ij,k}}{\sum_{k=1}^{K} C_{Ij,k}}.$$

The response time criteria is an inverse indicator for performance, where smaller values for the response time correspond to better performance for the pattern $P_j$. The response time criteria is normalized as follows:

$$NC_{Rj,k} = \frac{1/C_{Rj,k}}{\sum_{k=1}^{K} 1/C_{Rj,k}}.$$

These three criteria (bandwidth, IOPS, response time) are used to evaluate the performance of IO pattern $P_j$ comprehensively, with the comprehensive performance of IO pattern $P_j$ on storage tier k being determined according to the following equation:

$$G_{j,k} = NC_{Bj,k} + NC_{Ij,k} + NC_{Rj,k}$$

The IO pattern $P_j$'s performance difference (e.g., performance gain or penalty) between neighboring storage tiers can be determined according to the following equation:

$$DG_{j,(k\_k+1)} = G_{j,k} - G_{j,k+1}$$

The performance difference between neighboring storage tiers can be summarized for IO pattern $P_j$ based on its performance gain $G_{j,k}$, and its differential gain (k+1→k) denoted as $DG_{j,(k\_k+1)}$. For IO pattern $P_j$, if $DD_{j,(k\_k+1)} < \theta_{G\_diff}$, then the performance loss is as small as acceptable, so that storage objects with this kind or type of IO pattern can be demoted from a relatively high performance storage tier k to a relatively low performance storage tier k+1 providing cost savings with limited performance loss (e.g., as the cost of the relatively low performance storage tier k+1 is assumed to be less than the relatively high performance storage tier k). The value of $\theta_{G\_diff}$ may be defined to consider both an acceptable performance loss or gain, as well as relocation costs.

It should be noted that storage object relocation may be inter-storage array in a storage array cluster (e.g., between two different storage arrays in the storage array cluster) or intra-storage array in the storage array cluster (e.g., within the same storage array in the storage array cluster, such as between two or more storage devices thereof associated with different storage tiers). In some cases, it is desired to save computing resources of one or more of the storage arrays in the storage array cluster, such that at least some of the computations may be offloaded from such storage arrays (e.g., to one or more other storage arrays in the cluster, to an external server or host device, etc.). Computations such as summarizing IO patterns of different applications, testing and analyzing to determine IO pattern performance gains for different storage tiers, calculating the performance gain (or loss) differences between neighboring storage tiers, etc., may be offloaded. Each storage array may perform limited computations to save resources, such as classifying the IO pattern type for storage objects. It should be appreciated, however, that even such classification may be at least partially offloaded if desired. If there is a desire to increase the accuracy of IO pattern performance analysis, some embodiments can analyze the IO pattern performance gain (or loss) differences running on a storage array, and then analyze that storage array's IO performance gain difference $DG_{j,(k\_k+1)}$.

Storage object IO activity factors or criteria may be combined with IO pattern factors or criteria to determine which storage objects should and should not be relocated, and the appropriate destination storage tier and storage array for storage objects that should be relocated. Assume that the storage array cluster has N storage arrays, that there is a given storage object $o_{ni}$ which has a stable IO pattern, that a total number of storage objects is I, and where the given storage object $o_{ni}$ is on storage array n, with $0 \le n \le N$ and $0-i \le J$, and with the access count of the given storage object $o_{ni}$ being $c_{ni}$. The storage tiering policy for the given storage object $o_{ni}$ can be evaluated in two dimensions: IO pattern performance gain and IO activity. IO activity can be measured or determined using various metrics. As an example, IO activity may be measured by the number of storage object access times in the last time period T. The IO pattern performance gain (or loss) difference may be determined as described above. In some embodiments, the IO pattern performance gain (or loss) is analyzed first, where storage objects with performance differences between neighboring storage tiers that are less than a threshold can be moved to a lower storage tier without a significant performance penalty. For storage objects with performance differences between neighboring storage tiers that exceed a threshold, the IO activity and performance gain difference between the neighboring storage tiers is comprehensively analyzed to determine the proper or appropriate target storage tier that such storage objects should be relocated to (if at all).

The IO activity and IO pattern for the given storage object $o_{ni}$ can be generated as follows. It should be noted that the IO pattern may be duplicated, such that some storage objects have the same IO pattern, and usually the total number of different IO patterns is less than the number of storage objects. The "n" in $o_{ni}$ means the storage object on storage array n. The comprehensive "earning" (e.g., performance gain or penalty) combining IO activity and IO pattern factors or criteria between neighboring storage tiers can be determined according to the following equation:

$$E_{nij,(k\_k+1)} = c_{ni} * DG_{nij,(k\_k+1)}$$

The greater the value of $E_{ni(k\_k+1)}$, the greater the comprehensive earning for the given storage object $o_{ni}$ being promoted from storage tier k+1 to storage tier k (e.g., if the storage object is in storage tier k+1, it should be promoted to storage tier k tier to get more earnings). The given storage object $o_{ni}$ has an IO count $c_{ni}$, an IO pattern $P_{nij}$, a performance difference (from storage tier k+1→k) of $DG_{nij,(k\_k+1)}$, and an earning (from storage tier k+1→k) of $E_{nij,(k\_k+1)}$.

Storage arrays in the storage array cluster will now be described, where it is assumed that there are N storage arrays and K storage tiers in the storage array cluster, and where usually K≤3. If there are three storage tiers (e.g., an extreme performance storage tier, a performance storage tier, and a capacity storage tier) in the storage array cluster, then K=3. The available capacity size for storage tier k may be represented by: the storage array n's available size on storage tier k being denoted $S_{n,k}$; the storage array cluster's total available space on storage tier k being denoted $S_{c,k}$; and the storage array n available size ratio on storage tier k being denoted $R_{n,k}$. If a particular storage array in the storage array cluster has no storage devices providing storage resources of storage tier k, then $S_{n,k}=0$. Each storage array's available size ratio for each storage tier is calculated as $$R_{n,k} = \frac{S_{n,k}}{S_c},$$

with $1 \le n \le N$ and $1 \le k \le K$. In each storage tier k, the storage array with the biggest value of $R_{n,k}$ is considered the best candidate for handling data relocation. Thus, a target storage tier and a target storage array for storage object $o_{ni}$ are determined.

Figure 9:
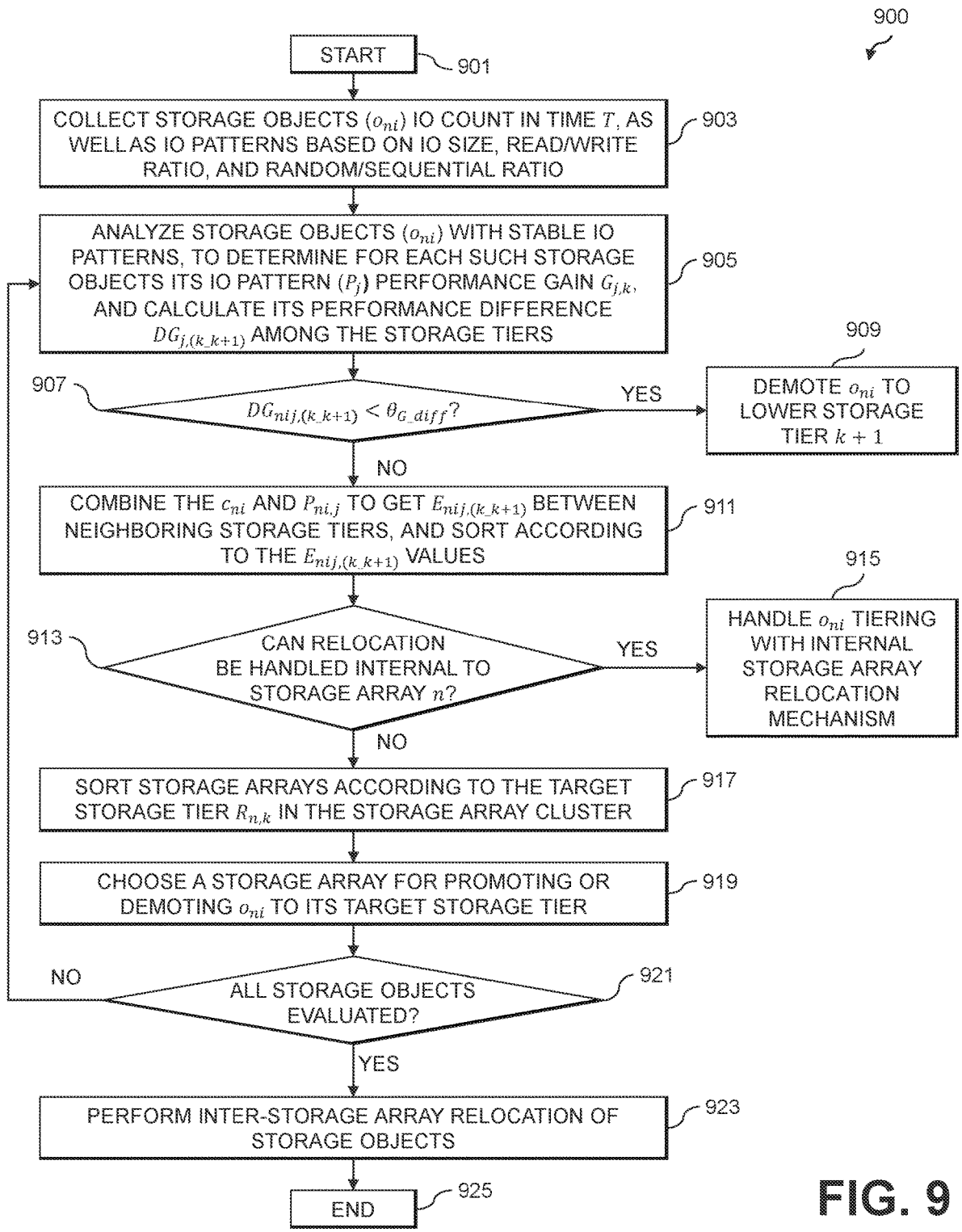
FIG. 9 shows a process flow for storage object relocation taking into account input/output patterns of storage objects in an illustrative embodiment.

FIG. 9 shows a process flow 900 for performing storage object relocation taking into account both IO activity and IO patterns of storage objects in a storage array cluster. The process flow 900 starts 901, and in step 903 the IO counts of storage objects, denoted $o_{ni}$, are collected for a time period T. Step 903 also includes collecting IO pattern metrics or criteria for the storage objects, where the IO pattern metrics or criteria include IO size, read/write ratio, and random/sequential ratio. In step 905, the storage objects with stable IO patterns are analyzed. Step 905 includes determining, for each storage object $o_{ni}$ with a stable IO pattern denoted $P_j$, an associated IO performance gain $G_{j,k}$ and performance gain difference $DG_{j,(k\_k+1)}$ among the storage tiers of the storage array cluster. In step 907, a determination is made as to whether the value of $DG_{nij,(k\_k+1)}$ for a given storage object $o_{ni}$ is less than a threshold $\theta_{G\_diff}$. If the result of the step 907 determination is yes, then in step 909 that storage object is demoted to a lower storage tier (e.g., storage tier k+1). If the result of the step 907 determination is no, the process flow 900 proceeds to step 911.

In step 911, the IO count ($c_{ni}$) and IO pattern ($P_{ni,j}$) of the storage objects $o_{ni}$ are combined to determine earning values, denoted $E_{nij,(k\_k+1)}$, between neighboring storage tiers k and k+1. A sort is then performed according to the $E_{nij,(k\_k+1)}$ values. In step 913, a determination is made as to whether relocation for a given storage object $o_{ni}$ can be handled internally to the storage array where the given storage object $o_{ni}$ is currently stored. If the result of the step 913 determination is yes, tiering for the storage object $o_{ni}$ is handled using internal storage array relocation mechanisms (e.g., FAST) at step 915. If the result of the step 913 determination is no, the process flow proceeds to step 917 where the storage arrays are sorted according to the target storage tier rank (e.g., $R_{n,k}$ values) in the storage array cluster. In step 919, a storage array in the storage array cluster is selected for promoting or demoting the given storage object $o_{ni}$ to its target storage tier. In step 921, a determination is made as to whether all storage objects have been evaluated. If the result of the step 921 determination is no, the process flow 900 returns to step 905. If the result of the step 921 determination is yes, the process flow 900 proceeds to step 923 where inter-storage array relocation of storage objects in the storage array cluster is performed (e.g., using FAST.X) based on the selections made in step 919. The process flow 900 then ends in step 925.

Figure 10:
FIG. 10 shows a table of example storage objects and their associated input/output patterns and current storage tier locations in an illustrative embodiment.

An example implementation of the FIG. 9 process flow will now be described, where it is assumed that the number of storage arrays in the storage array cluster N=2, and the number of storage objects I=6. It is further assumed that some of the storage objects have stable IO patterns, while other ones of the storage objects have random or non-stable IO patterns. FIG. 10 shows a table 1000 illustrating access frequency metrics (e.g., IO count), the IO pattern, and a current storage tier in the storage array cluster where each storage object is located. Here, it is assumed that the storage array cluster has K=3 tiers, including k=1 (an extreme performance tier utilizing SSD storage), k=2 (a performance tier utilizing SAS storage), and k=3 (a capacity tier utilizing NL-SAS storage). The IO patterns are denoted P1 (4K_70R_0S), P2 (8K_0R_100S), P3 (8K_90R_100S) and P4 (64K_0R_0S). The notation "N/A" is used for storage objects with random or non-stable IO patterns. The storage objects are identified by the storage array in which they are currently stored (e.g., n=1 or n=2) and a storage object number (e.g., i=1, . . . , 6), using notation $o_{ni}$. In the FIG. 10 example, storage object $o_{26}$ does not have a recognized stable IO pattern, and thus may be relocated based on its IO activity metric (e.g., IO count) alone.

The IO patterns of the remaining storage objects (e.g., with recognized stable IO patterns) are then analyzed to determine their associated performance gain differences between neighboring ones of the storage tiers. Storage objects with IO patterns exhibiting a performance gain difference below a designated threshold θ (e.g., where θ=10% or some other user-defined value) are candidates for demotion to a lower storage tier. Assume, for example, that the IO patterns P2 and P3 have a performance gain difference less than 10% between the performance (e.g., SAS) storage tier and the capacity (e.g., NL-SAS) storage tier. As such, any storage objects exhibiting IO patterns P2 and P3 which are currently stored in the performance (e.g., SAS) storage tier may be demoted to the lower capacity (e.g., NL-SAS) storage tier. In the FIG. 10 example, this means that the storage object $o_{12}$ will be demoted from the SAS storage tier to the NL-SAS storage tier, as there is no significant performance loss since the SAS and NL-SAS storage tiers have similar performance results for the IO pattern P2 exhibited by storage object $o_{12}$. The storage object $o_{13}$ will be kept on the NL-SAS storage tier, as there is no need (e.g., minimal or no performance benefit) that would be achieved through promotion of the storage object $o_{13}$ to the SAS storage tier as the SAS and NL-SAS storage tiers provide similar performance results for the IO pattern P3 exhibited by the storage object $o_{13}$. The storage object $o_{25}$ may be demoted from the SSD to the NL-SAS storage tier, as there will be no or minimal performance lost since the SSD, SAS and NL-SAS storage tiers have similar performance results for the IO pattern P2 exhibited by storage object $o_{25}$.

Figure 12:
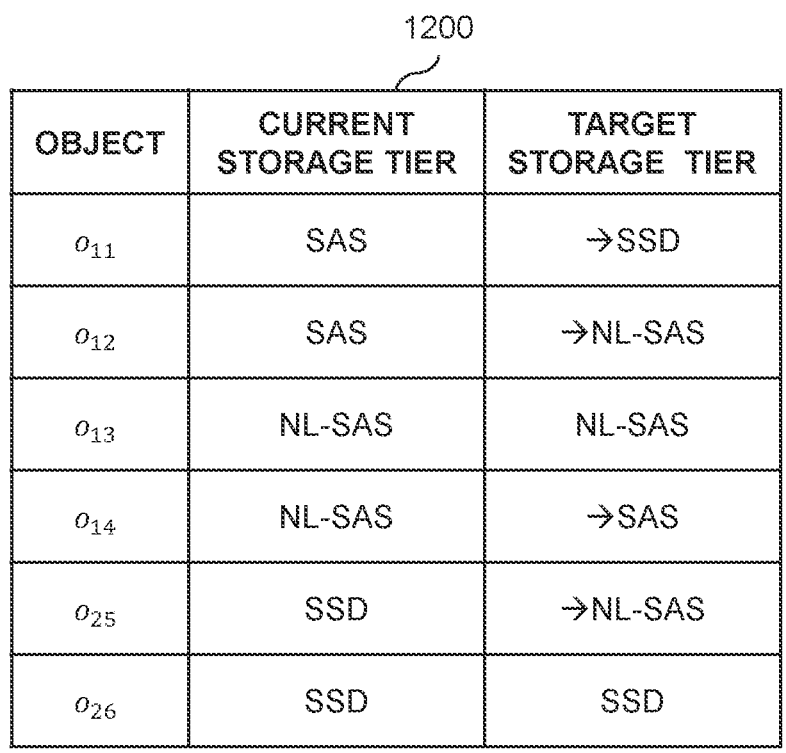
FIG. 12 shows a table of a storage object relocation guide in an illustrative embodiment.

As a result of the analysis of the IO patterns, it is determined that IO patterns P1, P3 and P4 exhibit significant (e.g., greater than some designated threshold) performance difference between the SAS and SSD storage tiers. For storage objects exhibiting the IO patterns P1, P3 and P4 stored on the SAS and SSD storage tiers, performance earnings are calculated taking into account IO activity to rank the storage objects and determine an appropriate target storage tier for those storage objects. In the FIG. 10 example, storage object $o_{11}$ may be promoted from the SAS to the SSD storage tier as it has the highest performance earning value, and storage object $o_{14}$ may be promoted from the NL-SAS to the SAS storage tiers as this also has a significant performance earning value. FIG. 11 shows tables 1100-1 and 1100-2 (collectively, table 1100) summarizing the results of analysis, including calculation of the performance gains, performance gain differences between storage tiers, the performance earnings achieved through promotion of storage objects between storage tiers, and the determined target storage tier for each of the storage objects. FIG. 12 shows a table 1200 illustrating a relocation guide for the storage objects, indicating a current storage tier and a target storage tier for each of the storage objects.

Figure 13A:
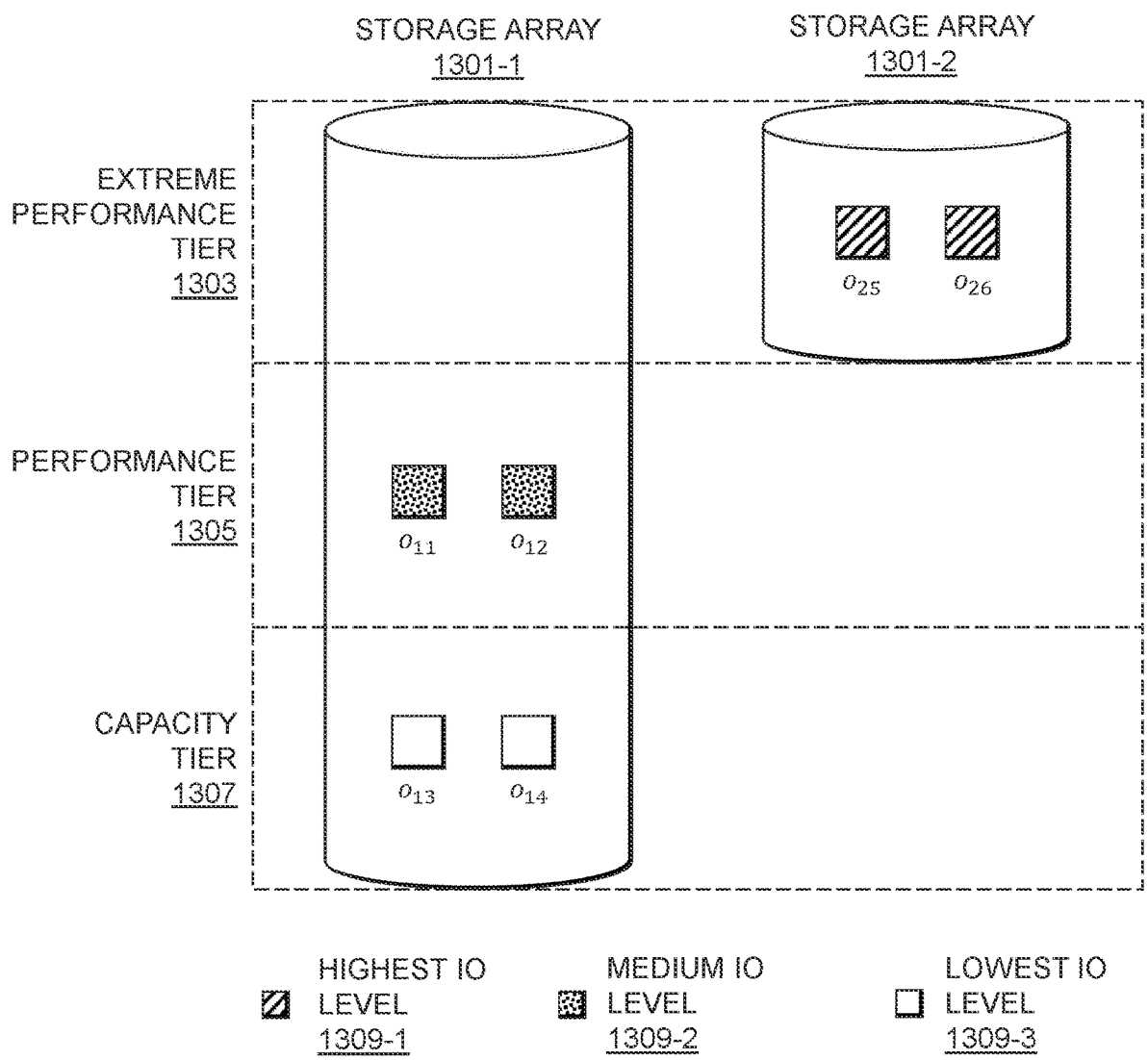
Figure 13B:
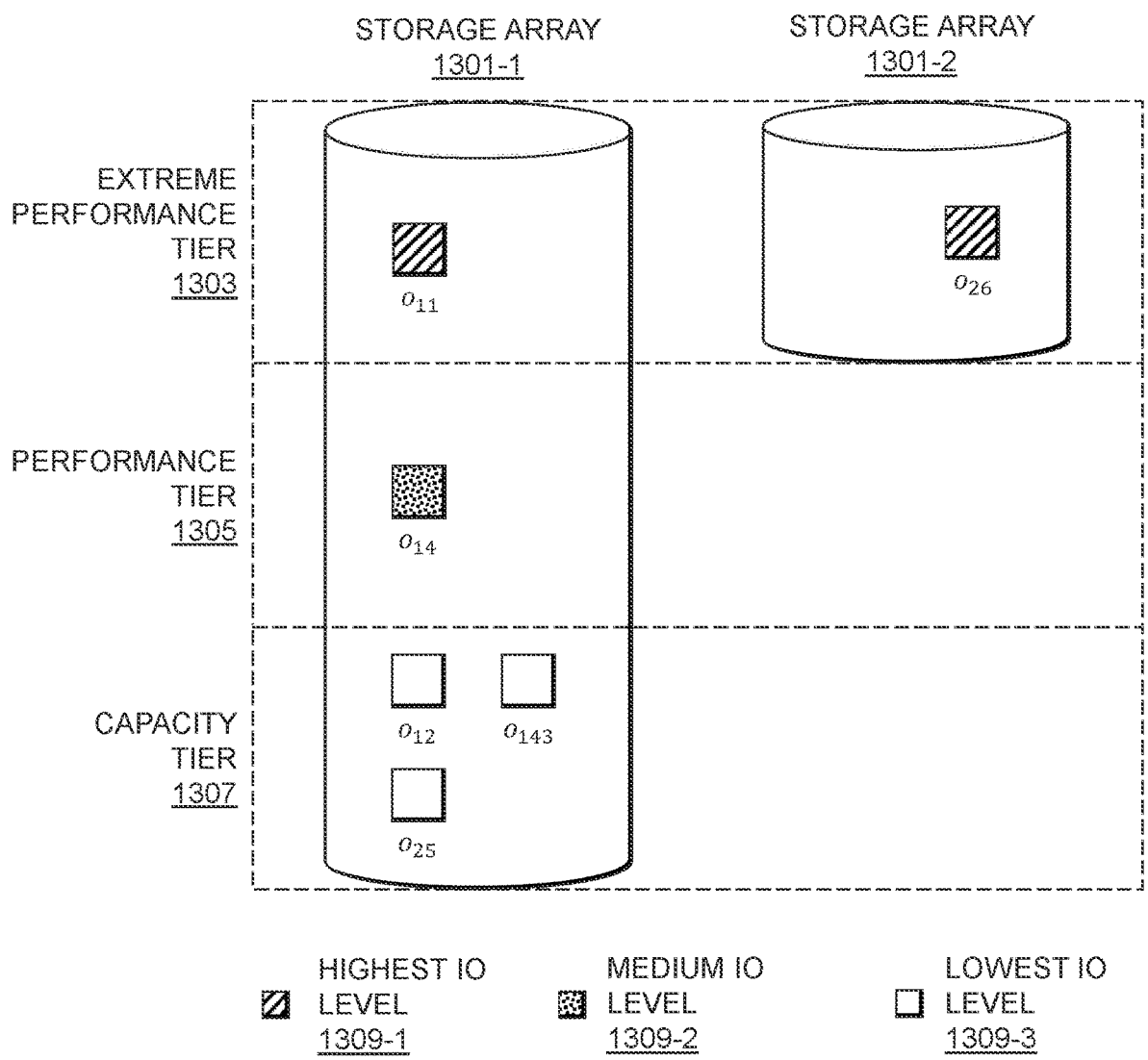

FIGS. 13A and 13B illustrate storage arrays 1301-1 and 1301-2 (collectively, storage arrays 1301) in a storage array cluster that includes three storage tiers—an extreme performance storage tier 1303, a performance storage tier 1305, and a capacity storage tier 1307. In this example, the storage array 1301-1 includes storage in each of the three tiers (e.g., the extreme performance storage tier 1303, the performance storage tier 1305 and the capacity storage tier 1307), and the storage array 1301-2 includes storage only in the extreme performance storage tier 1303.

Figure 13C:
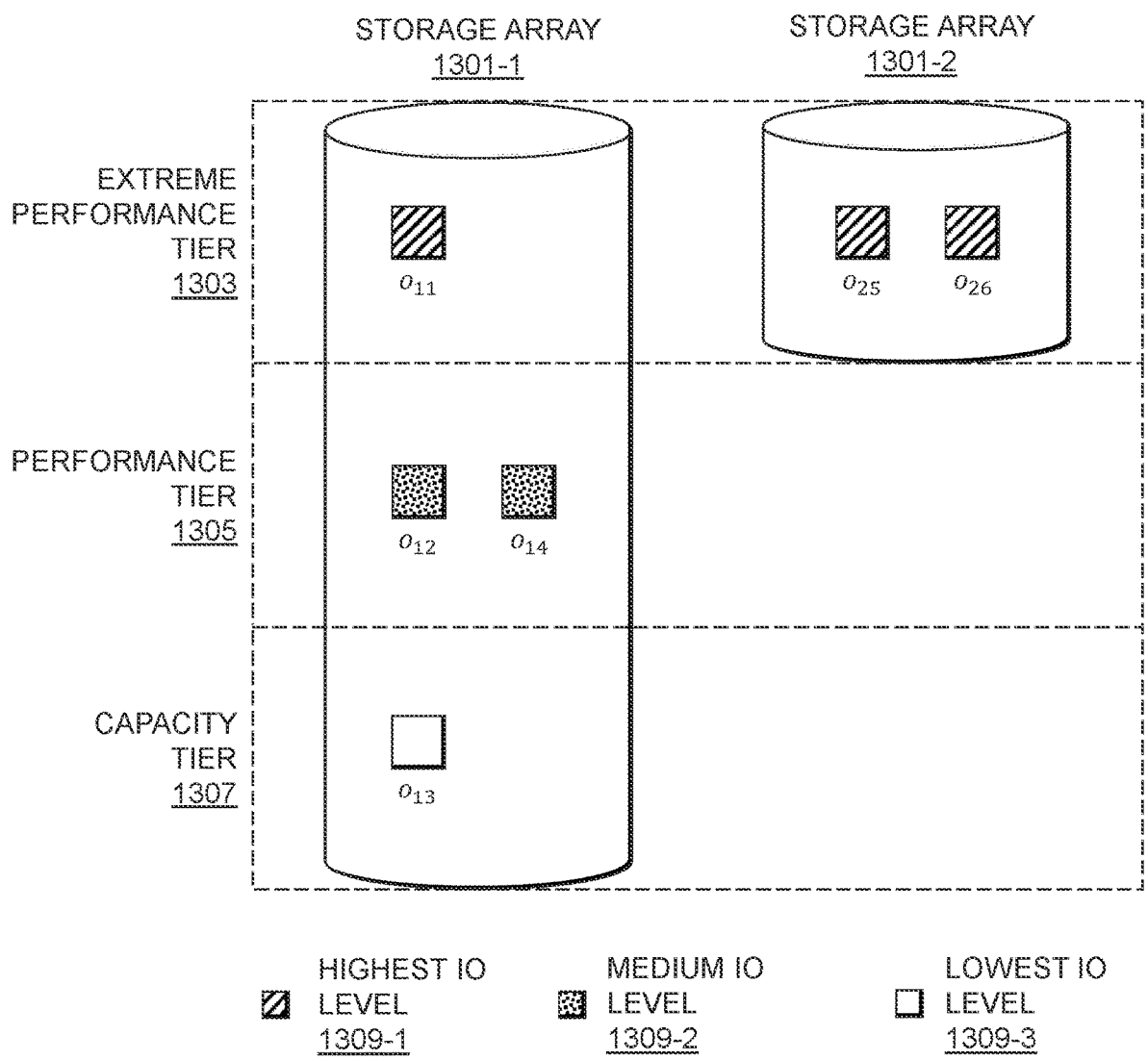

FIG. 13A shows data items (e.g., storage objects $o_{11}$, $o_{12}$, $o_{13}$, $o_{14}$, $o_{25}$, $o_{26}$) in the storage arrays 1301 in the storage array cluster prior to data movement using the process flow 900 of FIG. 9 with the example data summarized in the tables 1000, 1100 and 1200 of FIGS. 10-12. The storage objects are associated with one of three IO levels 1309-1, 1309-2 and 1309-3. The highest IO level 1309-1 corresponds to data items whose proper storage tier is the extreme performance storage tier 1303, the medium IO level 1309-2 corresponds to data items whose proper storage tier is the performance storage tier 1305, and the lowest IO level 1309-3 corresponds to data items whose proper storage tier is the capacity storage tier 1307. As detailed herein, the IO patterns of the storage objects are considered in addition to their associated IO levels 1309-1, 1309-2 and 1309-3 when determining whether and where to relocate the storage objects. FIG. 13B shows relocation of the storage objects in the storage arrays 1301 in the storage array cluster, using the process flow 900 of FIG. 9 with the example data summarized in the tables 1000, 1100 and 1200 of FIGS. 10-12. FIG. 13C shows relocation which considers only IO activity and not IO patterns (and their associated performance differences among the storage tiers 1303, 1305 and 1307). FIG. 13D shows a table 1350 showing the relocation of the storage objects from their current storage tier to the target storage tier considering IO activity alone. As illustrated in FIGS. 13B and 13C, consideration of IO pattern performance differences among the storage tiers in addition to IO activity when relocating storage objects provides various efficiencies, including in saving capacity in the highest cost storage tier (e.g., the extreme performance storage tier 1303) while avoiding or minimizing performance loss.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data movement between storage tiers of a clustered storage system based on input/output patterns of storage objects will now be described in greater detail with reference to FIGS. 14 and 15. Although described in the context of system 100, these platforms may also be used to implement at least portions of other information processing systems in other embodiments.

Figure 14:
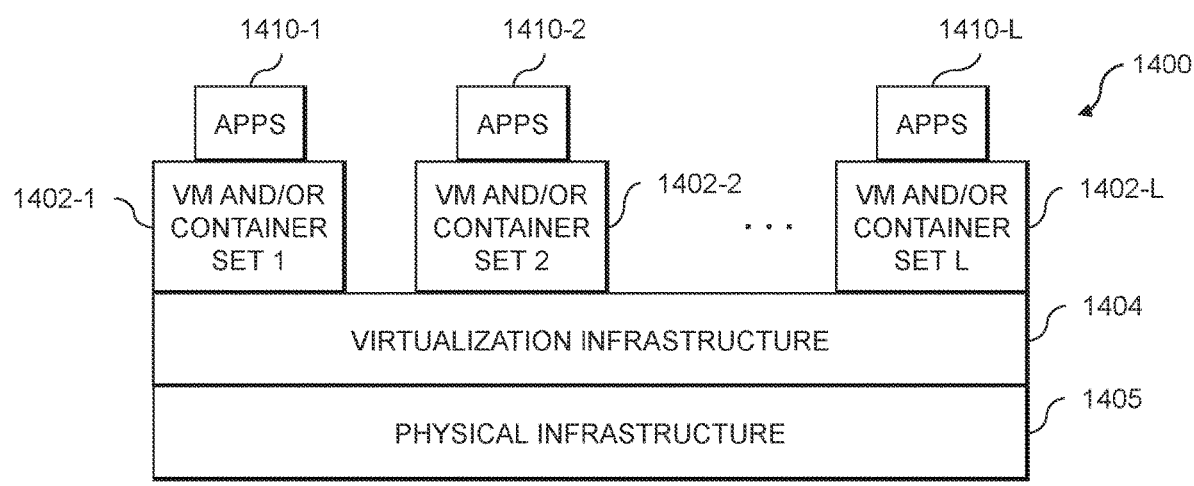
FIGS. 14 and 15 show examples of processing platforms that may be utilized to implement at least a portion of an information processing system in illustrative embodiments.
Figure 15:
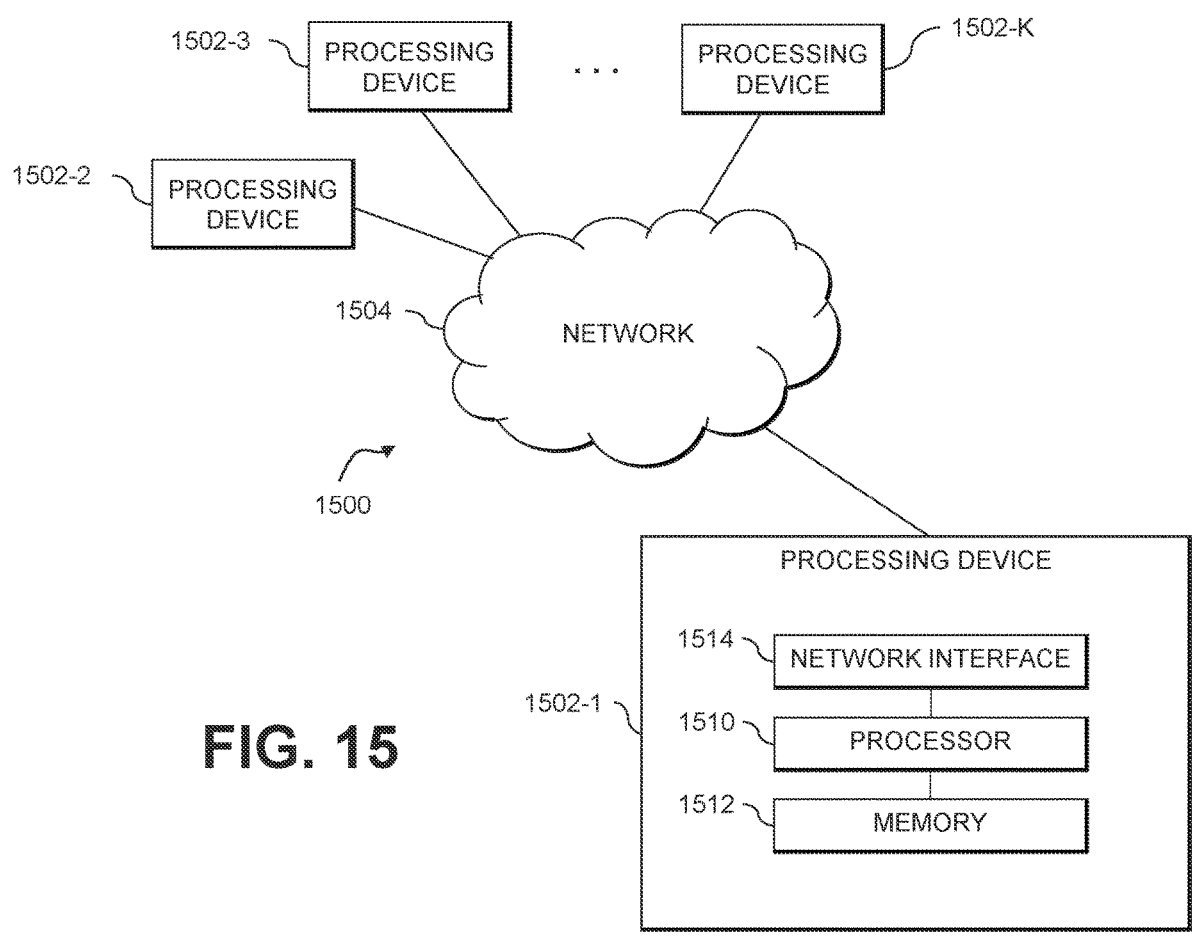

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data movement between storage tiers of a clustered storage system based on input/output patterns of storage objects as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage clusters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      classifying, based at least in part on monitoring input/output operations for a given storage object for a designated period of time, an input/output pattern associated with the given storage object, the input/output pattern associated with the given storage object being classified based at least in part on a size of the given storage object and at least one of a ratio of read operations to write operations for the given storage object for the designated period of time and a ratio of sequential input/output operations to random input/output operations involving the given storage object for the designated period of time, the given storage object being stored utilizing a first type of storage resources in a given one of two or more storage systems in a clustered storage system, the first type of storage resources being associated with a first one of two or more storage tiers in the clustered storage system;
      identifying, for the classified input/output pattern, a performance difference between (i) utilizing the first type of storage resources associated with the first one of the two or more storage tiers in the clustered storage system and (ii) utilizing at least a second type of storage resources associated with at least a second one of the two or more storage tiers in the clustered storage system;
      determining, based at least in part on the identified performance difference, whether to move the given storage object from being stored utilizing the first type of storage resources associated with the first one of the two or more storage tiers in the clustered storage system to the second type of storage resources associated with the second one of the two or more storage tiers in the clustered storage system; and
      moving, responsive to the determination, the given storage object to the second type of storage resources associated with the second one of the two or more storage tiers in the clustered storage system;
   wherein determining whether to move the given storage object comprises comparing the identified performance difference with a designated threshold;
   wherein the designated threshold is based at least in part on a cost of computing resources associated with movement of the given storage object from the first one of the two or more storage tiers in the clustered storage system to the second one of the two or more storage tiers in the clustered storage system;
   wherein the classified input/output pattern comprises one of a set of two or more different input/output patterns;
   wherein a first one of the two or more input/output patterns exhibits a first performance difference between (i) utilizing the first type of storage resources associated with the first one of the two or more storage tiers in the clustered storage system and (ii) utilizing the second type of storage resources associated with at least a second one of the two or more storage tiers in the clustered storage system; and
   wherein a second one of the two or more input/output patterns exhibits a second performance difference between (i) utilizing the first type of storage resources associated with the first one of the two or more storage tiers in the clustered storage system and (ii) utilizing the second type of storage resources associated with at least a second one of the two or more storage tiers in the clustered storage system, the second performance difference being different than the first performance difference.

2. The apparatus of claim 1 wherein moving the given storage object comprises:
   moving the given storage object from storage resources of the first type on the given one of the two or more storage systems to storage resources of the second type on the given one of the two or more storage systems responsive to determining that the given one of the two or more storage systems has sufficient available storage resources of the second type for storage of the given storage object; and moving the given storage object from storage resources of the first type on the given one of the two or more storage systems to storage resources of the second type on another one of the two or more storage systems in the clustered storage system responsive to determining that the given one of the two or more storage systems does not have sufficient available storage resources of the second type for storage of the given storage object.

3. The apparatus of claim 2 wherein the other one of the two or more storage systems is selected based at least in part on respective amounts of available storage resources of the second type on each of the two or more storage systems in the clustered storage system.

4. The apparatus of claim 1 wherein classifying the input/output pattern associated with the given storage object is based at least in part on:
the size of the given storage object;
the ratio of read operations to write operations for the given storage object for the designated period of time; and
the ratio of sequential input/output operations to random input/output operations involving the given storage object for the designated period of time.

5. The apparatus of claim 1 wherein identifying the performance difference comprises:
evaluating a first performance of a first set of one or more storage objects having the classified input/output pattern that are stored utilizing the first type of storage resources associated with the first one of the two or more storage tiers in the clustered storage system; and
evaluating a second performance of a second set of one or more storage objects having the classified input/output pattern that are stored utilizing the second type of storage resources associated with the second one of the two or more storage tiers in the clustered storage system.

6. The apparatus of claim 5 wherein the first performance and second performance are characterized by a set of performance metrics, the set of performance metrics comprising a bandwidth metric, an input/output operations per second metric, and a response time metric.

7. The apparatus of claim 1 wherein the first one of the two or more storage tiers in the clustered storage system provides a first performance level that is greater than a second performance level provided by the second one of the two or more storage tiers in the clustered storage system.

8. The apparatus of claim 7 wherein the designated threshold is set based at least in part on: an acceptable performance loss between the first performance level of the first one of the two or more storage tiers in the clustered storage system and the second performance level of the second one of the two or more storage tiers in the clustered storage system; and the cost of computing resources associated with movement of the given storage object from the first one of two or more storage tiers in the clustered storage system to the second one of the two or more storage tiers in the clustered storage system.

9. The apparatus of claim 1 wherein the first one of the two or more storage tiers in the clustered storage system provides a first performance level that is less than a second performance level provided by the second one of the two or more storage tiers in the clustered storage system.

10. The apparatus of claim 9 wherein the designated threshold is set based at least in part on: a performance gain between the first performance level of the first one of the two or more storage tiers in the clustered storage system and the second performance level of the second one of the two or more storage tiers in the clustered storage system; and the cost of computing resources associated with movement of the given storage object from the first one of two or more storage tiers in the clustered storage system to the second one of the two or more storage tiers in the clustered storage system.

11. The apparatus of claim 1 wherein determining whether to move the given storage object from being stored utilizing the first type of storage resources associated with the first one of the two or more storage tiers in the clustered storage system to the second type of storage resources associated with the second one of the two or more storage tiers in the clustered storage system is further based at least in part on an input/output activity level of the given storage object for the designated period of time.

12. The apparatus of claim 11 wherein the input/output activity level of the given storage object in the designated period of time is determined based on a count of the monitored input/output operations for the given storage object for the designated period of time.

13. A computer program product comprising a non-transitory processor-readable storage medium having stored therein program code of one or more software programs, wherein the program code when executed by at least one processing device causes the at least one processing device to perform steps of:
classifying, based at least in part on monitoring input/output operations for a given storage object for a designated period of time, an input/output pattern associated with the given storage object, the input/output pattern associated with the given storage object being classified based at least in part on a size of the given storage object and at least one of a ratio of read operations to write operations for the given storage object for the designated period of time and a ratio of sequential input/output operations to random input/output operations involving the given storage object for the designated period of time, the given storage object being stored utilizing a first type of storage resources in a given one of two or more storage systems in a clustered storage system, the first type of storage resources being associated with a first one of two or more storage tiers in the clustered storage system;
identifying, for the classified input/output pattern, a performance difference between (i) utilizing the first type of storage resources associated with the first one of the two or more storage tiers in the clustered storage system and (ii) utilizing at least a second type of storage resources associated with at least a second one of the two or more storage tiers in the clustered storage system;
determining, based at least in part on the identified performance difference, whether to move the given storage object from being stored utilizing the first type of storage resources associated with the first one of the two or more storage tiers in the clustered storage system to the second type of storage resources associated with the second one of the two or more storage tiers in the clustered storage system; and
moving, responsive to the determination, the given storage object to the second type of storage resources associated with the second one of the two or more storage tiers in the clustered storage system;

wherein determining whether to move the given storage object comprises comparing the identified performance difference with a designated threshold;

wherein the designated threshold is based at least in part on a cost of computing resources associated with movement of the given storage object from the first one of the two or more storage tiers in the clustered storage system to the second one of the two or more storage tiers in the clustered storage system;

wherein the classified input/output pattern comprises one of a set of two or more different input/output patterns;

wherein a first one of the two or more input/output patterns exhibits a first performance difference between (i) utilizing the first type of storage resources associated with the first one of the two or more storage tiers in the clustered storage system and (ii) utilizing the second type of storage resources associated with at least a second one of the two or more storage tiers in the clustered storage system; and wherein a second one of the two or more input/output patterns exhibits a second performance difference between (i) utilizing the first type of storage resources associated with the first one of the two or more storage tiers in the clustered storage system and (ii) utilizing the second type of storage resources associated with at least a second one of the two or more storage tiers in the clustered storage system, the second performance difference being different than the first performance difference.

14. The computer program product of claim 13 wherein the first one of the two or more storage tiers in the clustered storage system provides a first performance level that is greater than a second performance level provided by the second one of the two or more storage tiers in the clustered storage system, and wherein the designated threshold is set based at least in part on: an acceptable performance loss between the first performance level of the first one of the two or more storage tiers in the clustered storage system and the second performance level of the second one of the two or more storage tiers in the clustered storage system; and the cost of computing resources associated with movement of the given storage object from the first one of two or more storage tiers in the clustered storage system to the second one of the two or more storage tiers in the clustered storage system.

15. The computer program product of claim 13 wherein the first one of the two or more storage tiers in the clustered storage system provides a first performance level that is less than a second performance level provided by the second one of the two or more storage tiers in the clustered storage system, and wherein the designated threshold is set based at least in part on: a performance gain between the first performance level of the first one of the two or more storage tiers in the clustered storage system and the second performance level of the second one of the two or more storage tiers in the clustered storage system; and the cost of computing resources associated with movement of the given storage object from the first one of two or more storage tiers in the clustered storage system to the second one of the two or more storage tiers in the clustered storage system.

16. A method comprising:

classifying, based at least in part on monitoring input/output operations for a given storage object for a designated period of time, an input/output pattern associated with the given storage object, the input/output pattern associated with the given storage object being classified based at least in part on a size of the given storage object and at least one of a ratio of read operations to write operations for the given storage object for the designated period of time and a ratio of sequential input/output operations to random input/output operations involving the given storage object for the designated period of time, the given storage object being stored utilizing a first type of storage resources in a given one of two or more storage systems in a clustered storage system, the first type of storage resources being associated with a first one of two or more storage tiers in the clustered storage system;

identifying, for the classified input/output pattern, a performance difference between (i) utilizing the first type of storage resources associated with the first one of the two or more storage tiers in the clustered storage system and (ii) utilizing at least a second type of storage resources associated with at least a second one of the two or more storage tiers in the clustered storage system;

determining, based at least in part on the identified performance difference, whether to move the given storage object from being stored utilizing the first type of storage resources associated with the first one of the two or more storage tiers in the clustered storage system to the second type of storage resources associated with the second one of the two or more storage tiers in the clustered storage system; and moving, responsive to the determination, the given storage object to the second type of storage resources associated with the second one of the two or more storage tiers in the clustered storage system;

wherein determining whether to move the given storage object comprises comparing the identified performance difference with a designated threshold;

wherein the designated threshold is based at least in part on a cost of computing resources associated with movement of the given storage object from the first one of the two or more storage tiers in the clustered storage system to the second one of the two or more storage tiers in the clustered storage system;

wherein the classified input/output pattern comprises one of a set of two or more different input/output patterns;

wherein a first one of the two or more input/output patterns exhibits a first performance difference between (i) utilizing the first type of storage resources associated with the first one of the two or more storage tiers in the clustered storage system and (ii) utilizing the second type of storage resources associated with at least a second one of the two or more storage tiers in the clustered storage system;

wherein a second one of the two or more input/output patterns exhibits a second performance difference between (i) utilizing the first type of storage resources associated with the first one of the two or more storage tiers in the clustered storage system and (ii) utilizing the second type of storage resources associated with at least a second one of the two or more storage tiers in the clustered storage system, the second performance difference being different than the first performance difference; and wherein the method is performed by at least one processing device comprising a processor coupled to a memory.

17. The method of claim 16 wherein the first one of the two or more storage tiers in the clustered storage system provides a first performance level that is greater than a second performance level provided by the second one of the two or more storage tiers in the clustered storage system, and wherein the designated threshold is set based at least in part on: an acceptable performance loss between the first performance level of the first one of the two or more storage tiers in the clustered storage system and the second performance level of the second one of the two or more storage tiers in the clustered storage system; and the cost of computing resources associated with movement of the given storage object from the first one of two or more storage tiers in the clustered storage system to the second one of the two or more storage tiers in the clustered storage system.

18. The method of claim 16 wherein the first one of the two or more storage tiers in the clustered storage system provides a first performance level that is less than a second performance level provided by the second one of the two or more storage tiers in the clustered storage system, and wherein the designated threshold is set based at least in part on: a performance gain between the first performance level of the first one of the two or more storage tiers in the clustered storage system and the second performance level of the second one of the two or more storage tiers in the clustered storage system; and the cost of computing resources associated with movement of the given storage object from the first one of two or more storage tiers in the clustered storage system to the second one of the two or more storage tiers in the clustered storage system.

19. The apparatus of claim 1 wherein each of the two or more different input/output patterns exhibits a different magnitude of performance difference between (i) utilizing the first type of storage resources associated with the first one of the two or more storage tiers in the clustered storage system and (ii) utilizing the second type of storage resources associated with at least a second one of the two or more storage tiers in the clustered storage system.

20. The computer program product of claim 13 wherein each of the two or more different input/output patterns exhibits a different magnitude of performance difference between (i) utilizing the first type of storage resources associated with the first one of the two or more storage tiers in the clustered storage system and (ii) utilizing the second type of storage resources associated with at least a second one of the two or more storage tiers in the clustered storage system.

* * * * *